United States Patent
Yokoyama et al.

(10) Patent No.: US 8,711,997 B2
(45) Date of Patent: Apr. 29, 2014

(54) REACTOR CORE OF LIQUID METAL COOLED REACTOR

(75) Inventors: Tsugio Yokoyama, Yokohama (JP); Hisato Matsumiya, Yokohama (JP); Yasushi Tsuboi, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 13/361,543

(22) Filed: Jan. 30, 2012

(65) Prior Publication Data

US 2012/0183113 A1 Jul. 19, 2012

Related U.S. Application Data

(60) Continuation of application No. 13/006,260, filed on Jan. 13, 2011, now abandoned, which is a continuation of application No. 12/625,173, filed on Nov. 24, 2009, now abandoned, which is a division of application No. 12/270,680, filed on Nov. 13, 2008, now abandoned, which is a continuation of application No. 11/377,178, filed on Mar. 17, 2006, now abandoned, which is a division of application No. 09/749,547, filed on Dec. 28, 2000, now Pat. No. 7,139,352.

(30) Foreign Application Priority Data

Dec. 28, 1999 (JP) .................................. H11-375240
Feb. 25, 2000 (JP) .................................. 2000-049031

(51) Int. Cl.
  *G21C 7/06* (2006.01)
  *G21C 7/00* (2006.01)

(52) U.S. Cl.
USPC ........... 376/220; 376/207; 376/219; 376/221; 376/327; 376/339; 376/409; 376/412; 376/419; 376/426; 376/447

(58) Field of Classification Search
USPC ......... 376/220, 219, 221, 327, 207, 222–239, 376/339, 409, 412, 419, 426, 434, 447
See application file for complete search history.

(56) References Cited

U.S. PATENT DOCUMENTS 3,449,208 A    6/1969   Balent et al.
3,660,228 A *  5/1972   Magladry ..................... 376/209
(Continued)

FOREIGN PATENT DOCUMENTS

FR    2711835 A1 *  5/1995  ............... G21C 1/02
RU    2122245 C1 *  11/1998  ............... G21C 7/10

OTHER PUBLICATIONS

Wisshak et al., "Stellar neutron capture cross section of Gd isotopes," Phys. Rev. C, vol. 20, No. 5, Nov. 1995, pp. 2762-2779.*

(Continued)

*Primary Examiner* — Bernarr Gregory
(74) *Attorney, Agent, or Firm* — Oblon, Spivak, McClelland, Maier & Neustadt, L.L.P.

(57) ABSTRACT

A reactor core is immersed in a liquid metal coolant in a core barrel of a liquid metal cooled reactor. The reactor core includes a plurality of fuel assemblies contained in the core barrel, a neutron absorber that absorbs a neutron in the reactor core, and a neutron moderator that moderates a neutron therein so as to control a reactivity of the reactor core. The neutron absorber and the neutron moderator constitute a mixture contained in reactivity control assemblies of the reactor core in the liquid metal coolant prior to immersion of the reactor core. The neutron moderator is composed of zirconium hydride.

2 Claims, 19 Drawing Sheets

(56) References Cited

U.S. PATENT DOCUMENTS

| | | | |
|---|---|---|---|
| 3,945,886 A | | 3/1976 | Derevyankin et al. |
| 3,959,072 A | | 5/1976 | Dupen |
| 4,045,283 A | * | 8/1977 | Noyes et al. .................. 376/239 |
| 4,118,275 A | | 10/1978 | Carleton et al. |
| 4,127,443 A | * | 11/1978 | Wetch et al. .................. 376/220 |
| 4,227,967 A | * | 10/1980 | Zebroski ....................... 376/219 |
| 4,576,787 A | | 3/1986 | Alsop et al. |
| 4,652,427 A | * | 3/1987 | Uchikawa et al. ............ 376/447 |
| 4,751,041 A | | 6/1988 | Ferrari |
| 4,832,906 A | * | 5/1989 | Aoyama et al. ............... 376/419 |
| 5,167,906 A | | 12/1992 | Edlund et al. |
| 5,196,159 A | | 3/1993 | Kawashima et al. |
| 5,416,813 A | | 5/1995 | Hiraiwa et al. |
| 5,420,897 A | | 5/1995 | Kasai et al. |
| 5,629,965 A | | 5/1997 | Soga et al. |
| 5,946,367 A | | 8/1999 | Maruyama et al. |

OTHER PUBLICATIONS

Wisshak et al., "Stellar neutron capture cross section of Gd isotopes," Phys. Rev. C. vol. 20., No. 5, Nov. 1995, pp. 2762-2779.

Merriam-Webster's Collegiate Dictionary, 10$^{th}$ Edition, 1993, p. 746.

* cited by examiner

REACTOR CORE OF LIQUID METAL COOLED REACTOR

CROSS-REFERENCE TO RELATED APPLICATIONS

This application is a continuation of U.S. application Ser. No. 13/006,260 (now abandoned) filed Jan. 13, 2011, which is a continuation of U.S. application Ser. No. 12/625,173 (now abandoned) filed Nov. 24, 2009, which is a division of U.S. application Ser. No. 12/270,680 (now abandoned) filed Nov. 13, 2008, which is a continuation of U.S. application Ser. No. 11/377,178 (now abandoned) filed Mar. 17, 2006, which is a division of U.S. application Ser. No. 09/749,547 filed Dec. 28, 2000, now U.S. Pat. No. 7,139,352, which claims the benefit of Japanese Patent Application No. H11-375240 filed Dec. 28, 1999 and Japanese Patent Application No. 2000-049031 filed Feb. 25, 2000. The entire contents of these applications are incorporated herein by reference.

BACKGROUND OF THE INVENTION

1. Field of the Invention

The present invention relates to a reactivity control rod for a core. a core of a nuclear. a nuclear reactor and a nuclear power plant.

More particularly, the present invention relates to a reactivity control rod for a core, which can elongate the lifetime of the core, a core of a nuclear reactor composed of the reactivity control rod, which can have a long lifetime. A nuclear reactor which is cooled by a liquid metal and is able to reduce scattering of the liquid metal so as to be made into a small size thereof and a nuclear power plant which comprises the nuclear reactor.

2. Description of the Related Art

A conventional liquid metal: cooled nuclear reactor with a small size. that is, a fast reactor is disclosed in U.S. Pat. No. 5,420,897.

Moreover, a conventional fast reactor has a structure for moving a neutron reflector in a vertical direction so as to adjust (control) a leakage of neutron from the core thereof, thus to compensate a change of .reactivity of the core due to a burn-up (combustion) thereof.

In the aforesaid conventional liquid metal cooled nuclear reactors, an intermediate heat exchanger is arranged in a reactor vessel. A primary coolant performs the heat exchanging operation with a secondary coolant in the intermediate heat exchanger, and the exchanged secondary coolant is circulated to a steam generator arranged outside the reactor vessel so as to generate a steam. Namely, the conventional liquid metal cooled nuclear reactor has a structure of requiring a steam generator for generating a steam, an electromagnetic pump for circulating a secondary coolant between the reactor vessel and the steam generator, and piping equipments connecting them.

An activated liquid metal such as sodium is used as each of the coolants. For this reason, the reactor vessel and a facility using the liquid metal arranged around the reactor vessel have complicated structures, so that there is the possibility that an auxiliary facility is required in preparation for a leakage of the activated liquid metal, fire caused thereby or the like.

Moreover, in the conventional liquid metal cooled nuclear reactor, the liquid metal which is easily activated, such as sodium is used as the coolant. That is, in the steam generator, the liquid metal which is easily activated reacts to water to generate a steam. For this reason, in cases where a water leakage occurs in a heating tube of the steam generator, it is difficult to avoid an occurrence of an accident caused by the reaction between the sodium and the leaked water.

The reaction between the sodium and the leaked water causes a reaction product, so that, in order to prevent the reaction product from directly being radiated, a secondary cooling system facility must be required.

In addition, a facility for housing the reaction product must be required so that there is the possibility that the reactor system, as a whole, is made into a large size thereof, and that the cost of manufacturing the reactor system is made to be increased.

Furthermore, the electromagnetic pump is arranged in a liquid metal; however, it is coaxially arranged in series on a downstream side (lower side) of the intermediate heat exchanger in view of a heat resistant characteristic of a large-sized conductive coil of the electromagnetic pump or the like. On the other hand, each of tube plates arranged above and below the intermediate heat exchanger has a structure which is easy to receive a thermal stress, and an enlargement of its diameter causes an increase of the thermal stress so that it is taken into consideration to prevent each of the tube plates from being made into a large size thereof.

As described above, in the conventional liquid metal cooled reactor, the intermediate heat exchanger and the electromagnetic pump are vertically arranged in series; for this reason, the reactor is made into a large size thereof in its height direction (in its axial direction).

The reactor with a large size in its axial direction has a structure which is easily oscillated, thereby making it unstable.

On the other hand, in a conventional neutron reflector migration type of fast reactor, when elongating the lifetime of the core thereof, it must be necessary to make long the length of fuel assembly in the core.

That is, according to the progress of combustion of the fuel assembly, a reactivity of the fuel assembly becomes negative.

Therefore, in order to offset the negative reactivity, a neutron reflector is left up from a lower portion of the core to cover the height thereof so as to improve the ability of reflecting neutron, thereby increasing a positive reactivity of the neutron reflector, so that a reactivity of the whole core of the reactor needs to be set to 0; that is, it is necessary to make the reactor operate so as to keep a combustion in a critical state.

Thus, in order to elongate an operating period of the reactor, a fuel length of the fuel assembly must be made long. Furthermore, in cases where the fuel length of the fuel assembly is made long, the reactor vessel of the reactor becomes long as a whole; as a result, there is the possibility of deteriorating the economics of the reactor. Furthermore, there are problems of causing a change of reactivity by deformation of the core in the lifetime thereof the core, an increase of pullout force of the fuel assembly.

SUMMARY OF THE INVENTION

The present invention is made in view of the aforesaid problems in the related art.

Accordingly, it is an object of the present invention to provide a nuclear reactor, which is capable of limiting a space for housing a liquid metal used as a coolant into an inside of a reactor vessel thereof so as to prevent scattering of the coolant to the outside thereof, whereby it is possible to make simple the whole structure of the nuclear reactor with a cooling facility, and to make compact the whole structure thereof, and to provide a nuclear power plant comprising the nuclear reactor.

In order to achieve such object, according to one aspect of the present invention, there is provided a nuclear reactor in which a primary coolant is contained, including: a core composed of nuclear fuel, the coolant moving upwardly from the core by an operation thereof; an annular steam generator arranged in an upper side of the core into which the upwardly moving coolant flows and adapted to transfer heat in the coolant into water therein to generate a steam; a passage structure that defines a coolant passage for the coolant to an outside of the core, the heat-transferred coolant in the annular steam generator flowing downwardly in the coolant passage so as to flow into the core, thereby moving upwardly; and a reactor vessel arranged to surround the coolant passage so as to contain the core, the annular steam generator and the coolant passage therein.

In order to achieve such object, according to another aspect of the present invention, there is provided a nuclear power plant comprising a nuclear reactor in which a coolant is contained, the nuclear reactor including: a core composed of nuclear fuel, the coolant moving upwardly from the core by an operation thereof; an annular steam generator having a plurality of heat transfer tubes and arranged in an upper side of the core into which the upwardly moving coolant flows, the annular steam generator transferring heat in the coolant with water in the heat transfer tubes to generate a steam; a passage structure that defines a coolant passage for the coolant to an outside of the core, the heat-transferred coolant in the annular steam generator flowing downwardly in the coolant passage so as to flow into the core, thereby moving upwardly; and a reactor vessel arranged to surround the coolant passage so as to contain the core, the annular steam generator and the passage means therein; a feed water branch pipe connecting to corresponding to heat transfer tubes; a steam branch pipe connecting to corresponding to heat transfer tubes, the feed water branch pipe and the steam branch pipe independently penetrating through a reactor container facility; a first feed water pipe; a steam pipe, the feed water branch pipe and the steam branch pipe being connected to the first feed water pipe and the steam pipe outside the reactor container facility, respectively; a steam bypass pipe branching from the steam branch pipe and provided with a steam separator having a bottom portion; an air conditioner provided for the steam separator via a steam facility pipe thereof; and a second feed water pipe with a feed-water pump, the bottom portion of the steam separator being connected through the second feed water pipe to the feed water branch pipe.

In order to achieve such object, according to further aspect of the present invention, there is provided a reactivity control rod for use in a reactor core and for controlling a reactivity therein, comprising: a tube portion; and a mixture filled in the tube portion, the mixture being made by mixing a neutron absorber that absorbs a neutron and a neutron moderator that moderates a neutron.

In order to achieve such object, according to still further aspect of the present invention, there is provided a reactor core in a core barrel of a nuclear reactor, comprising: a plurality of fuel assemblies contained in the core barrel; and a mixture contained in the core barrel, the mixture being made of a neutron absorber that absorbs a neutron in the core and a neutron moderator that moderates a neutron therein so that a reactivity of the core is controlled.

According to the present invention, it is possible to reduce a heat value dispersed to the outside, thereby improving a heat efficiency thereof, and to make the reactor vessel compact into a small size as a whole, thereby securely preventing a leakage of the liquid metal.

Furthermore, according to the present invention, because the whole of the reactor vessel is kept at a suitable temperature, and is protected from a rapid heat transit, it is possible to secure a structural safety of the reactor, and to make an operation of the reactor for a long period. In addition, after a shutdown of the reactor, because a natural circulating force generated by heating of the core and radiation from the reactor vessel is effectively used, it is possible to stably carry out a decay heat removal operation of the reactor.

Still furthermore, in particular, the shape of the reactor is miniaturized in its longitudinal direction, and therefore, it is possible to prevent a contact of the liquid metal with the water so as to make an operation of the reactor for a long period.

BRIEF DESCRIPTION OF THE DRAWINGS

Other principles of the present invention will become apparent from the following description of embodiments of the present invention with reference to the accompanying drawings in which.

DETAILED DESCRIPTION OF THE PREFERRED EMBODIMENTS

The preferred embodiments of the present invention will be described below with reference to the accompanying drawings.

In these embodiments, as one example of a nuclear reactor according to the present invention, a liquid metal cooled reactor is described First Embodiment (FIG. 1 to FIG. 8)

A liquid metal cooled nuclear reactor of this first embodiment is generally constructed in the following manner.

More specifically, the liquid metal cooled nuclear reactor schematically comprises a reactor vessel housing therein a reflector and a neutron shield, and a partition wall structure defining a coolant passage capable of utilizing a heat generated by these reflector and neutron shield as an output of the reactor.

Furthermore, the liquid metal cooled nuclear reactor comprises an electromagnetic pump and a steam generator annularly arranged, and the electromagnetic pump is arranged so as to be included in a downstream side of the steam generator so that an upper portion of the electromagnetic pump and a lower portion of the steam generator is overlapped in the axial direction thereof.

The liquid metal cooling facility including the partition wall structure deciding the coolant passage, the electromagnetic pump and the steam generator and the reactor core are housed in the reactor vessel so as to make small a heat value dispersed to the outside thereof, thereby improving a heat efficiency of the reactor core, thus it is capable of making compact the reactor vessel as a whole, thereby reducing the possibility of leakage can be reduced to the utmost.

Figure 1:
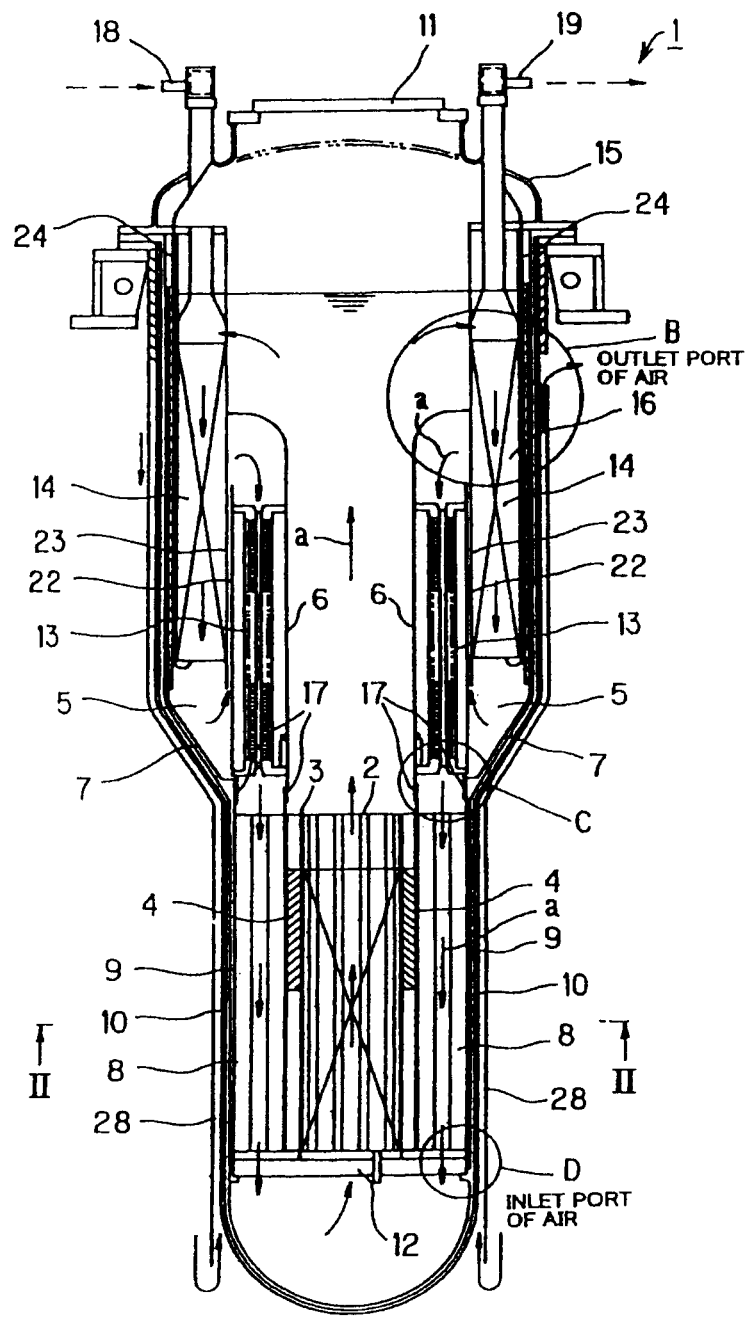
FIG. 1 is a longitudinal cross sectional view illustrating a liquid metal cooled nuclear reactor according to a first embodiment of the present invention.

FIG. 1 is a view illustrating a structure of a liquid metal cooled nuclear reactor. The liquid metal cooled nuclear reactor 1 has a core 2 composed of nuclear fuel assemblies each of which is packed with a nuclear fuel, and the core 2 is formed into a substantially cylindrical shape. The outer periphery of the core 2 is surrounded by a core barrel 3 for protecting the core 2. An annular reflector 4 is arranged outside of the core barrel 3 so as to surround the core barrel 3. An inner partition wall 6 is provided outside the reflector 4. The inner partition wall 6 surrounds the outer periphery of the reflector 4 so as to define an inner wall of a coolant passage 5 of liquid metal which is used as a primary coolant. An outer partition wall 7 defining an outer wall of the coolant passage 5 is arranged outside the inner partition wall 6 at a predetermined space. In the coolant passage 5, a neutron shield 8 is disposed so as to surround the core 2. A reactor vessel 9 is provided outside the outer partition wall 7 so as to house it, and further, a guard vessel 10 for protecting the reactor vessel 9 is arranged outside the reactor vessel 9.

The reflector 4 is suspended by a plurality of driving shafts (not shown) penetrating through an upper plug 11, and is supported so as to be vertically movable by a reflector driving device (not shown). The inner partition wall 6 is extended upwardly from a base plate 12 on which the core 2 is mounted so as to form the annular coolant passage 5 between it and the outer partition wall 7, in which the neutron shield 8 is disposed.

In the coolant passage 5 above the disposed neutron shield 8, an electromagnetic pump 13 and a steam generator 14 are annularly arranged, and the electromagnetic pump 13 is arranged so as to be included in a downstream side of the steam generator 14 so that an upper portion of the electromagnetic pump and a lower portion of the steam generator is overlapped in the axial direction thereof.

The steam generator 14 has a shell side through which the liquid metal, which is a primary coolant, flows, and a tube side including a plurality of heat transfer tubes 16 through which water, which is a secondary coolant, flow so that a heat exchange is performed via walls of the heat transfer tubes 16 in the steam generator 14.

The steam generator 14 and the electromagnetic pump 13 are arranged so that a predetermined space as a part of the coolant passage 5 is formed between an inner periphery of the steam generator 14 and an outer periphery of the electromagnetic pump 13, whereby the primary coolant discharged from a lower end portion of the steam generator 14 is sucked from the upper end portion of the electromagnetic pump 13 via the formed part of the coolant passage 5.

Figure 2:
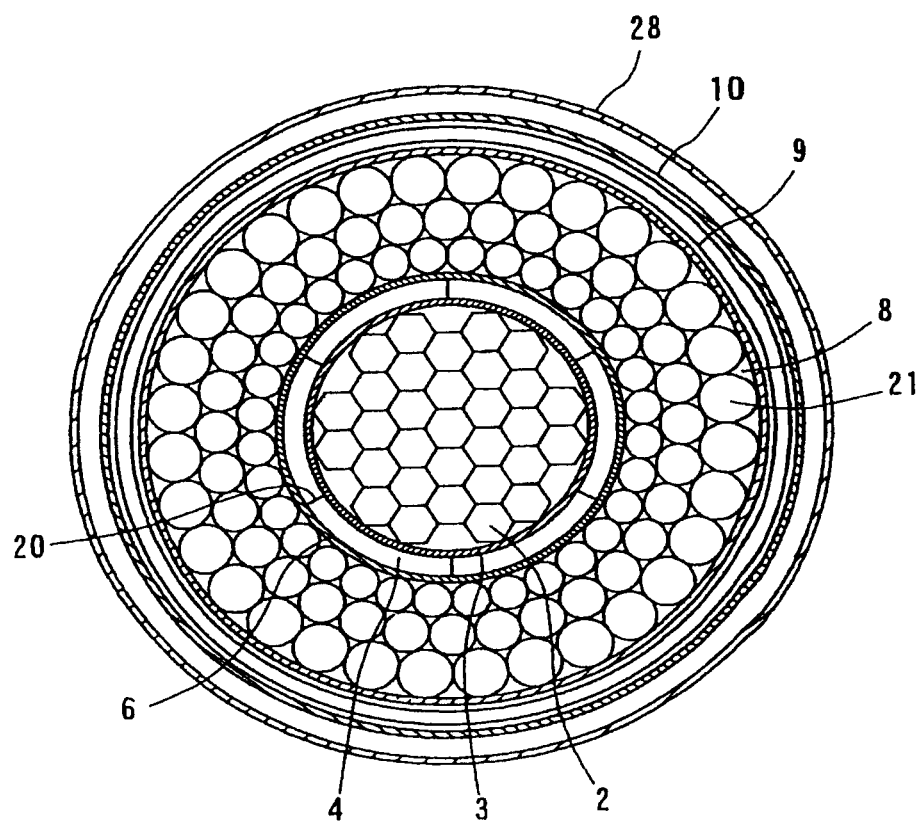
FIG. 2 is a cross sectional view taken along a line II-II of FIG. 1.

FIG. 2 is the lateral sectional view taken along a line II-II shown in FIG. 1.

As shown in FIG. 2, the core 2 is formed into a shape of circle in its lateral cross section, and the core barrel 3 is provided outside the core 2. Moreover, the reflector 4 comprises several split cylindrical elements each having both end surfaces, which are annularly arranged outside the core barrel 3 with the adjacent end surfaces of the adjacent cylindrical elements jointed to each other. The inner partition wall 6 is arranged outside the reflector 4. In this case, the end surfaces of the several split cylindrical elements extend over the entire length of the reflector 4 in the longitudinal direction thereof.

In this embodiment, for example, the reflector 4 is divided into six cylindrical elements which are suspended by the driving shafts (not shown) so as to be movable in the longitudinal direction thereof without interference with each other. In FIG. 2, the neutron shield 8 comprises a plurality of cylinders 21 annularly arranged to be spaced out each other, and the cylinders 21 are arranged outside the outer periphery of the inner partition wall 6.

In this first embodiment, six driving shafts (not shown) suspending the six divided cylindrical elements are arranged at a position equally separated from the center axis of the reactor vessel 9.

The electromagnetic pump 13 is arranged outside the driving shaft above the core 2 via the inner partition wall 6, shown in FIG. 1. Furthermore, the steam generator 14 is arranged outside the electromagnetic pump 13 via an outer shell 22 of the electromagnetic pump 13 and the coolant passage 5 for the primary coolant. The steam generator 14 has an inner shell 23 arranged outside the outer shell 22 of the electromagnetic pump 22 so as to surround the upper portion of the inner shell 22 thereof, an outer shell 24 arranged outside the inner shell 23 at a predetermined space so as to surround the inner shell 23, and the heat transfer tubes 16 arranged between the inner shell 23 and the outer shell 24.

Still furthermore, the reactor core 1 comprises an inlet nozzle 18 which is mounted on the upper side of the reactor vessel 9 so as to be penetrated in sealed state therethrough, and an outlet nozzle 19 which is mounted on the upper side of the reactor vessel 9 so as to be penetrated in sealed state therethrough.

Next, the following is a description on an operation of the liquid metal cooled nuclear reactor 1 according to the first embodiment.

In the liquid metal cooled nuclear reactor 1, the core 2 uses the nuclear fuel containing plutonium or the like, and, in the actual operation of the reactor 1, the nuclear fuel including the plutonium or the like is split to generate heat, and, simultaneously, to cause excessive fast neutrons to be absorbed in depleted uranium, thereby generating plutonium on an amount equally to that to be burned up. The reflector 4 reflects the neutrons irradiated from the core 2 to thereby facilitate burn-up and breeding of the nuclear fuel in the core 2.

With the burn-up of the nuclear fuel, the reflector 4 is gradually moved vertically in the axial direction of the core 2, while maintaining the criticality of the nuclear fuel.

According to the vertical movement of the reflector 4, a new portion of the fuel in the core 2 is then gradually burned up, and thus keeping an operation of the reactor 1 for a long period with the burn-up maintained.

In the operation of the reactor 1, the reactor vessel 9 is filled with a liquid metal, which is a primary coolant, and the core 2 is cooled by the primary coolant while taking, the outside of the core 2, heat generated by the nuclear fission therein. In FIG. 1, solid line arrow "a" of a solid line shows a flowing direction of the primary coolant. As shown by these solid line arrows, the primary coolant moves downward by the operation of the electromagnetic pump 13, and then, flows downwardly through the inside of the neutron shield 8 so as to enter into the bottom portion of the reactor vessel 9. Therefore, since the primary coolant flows through the inside of the neutron shield 8, it is possible to effectively cool the neutron shield 8.

Next, the primary coolant moves upwardly while flowing through the core 2 and being heated therein, and after that, flows into the shell side of the steam generator 14 at the upper portion of the reactor vessel 9.

Figure 3:
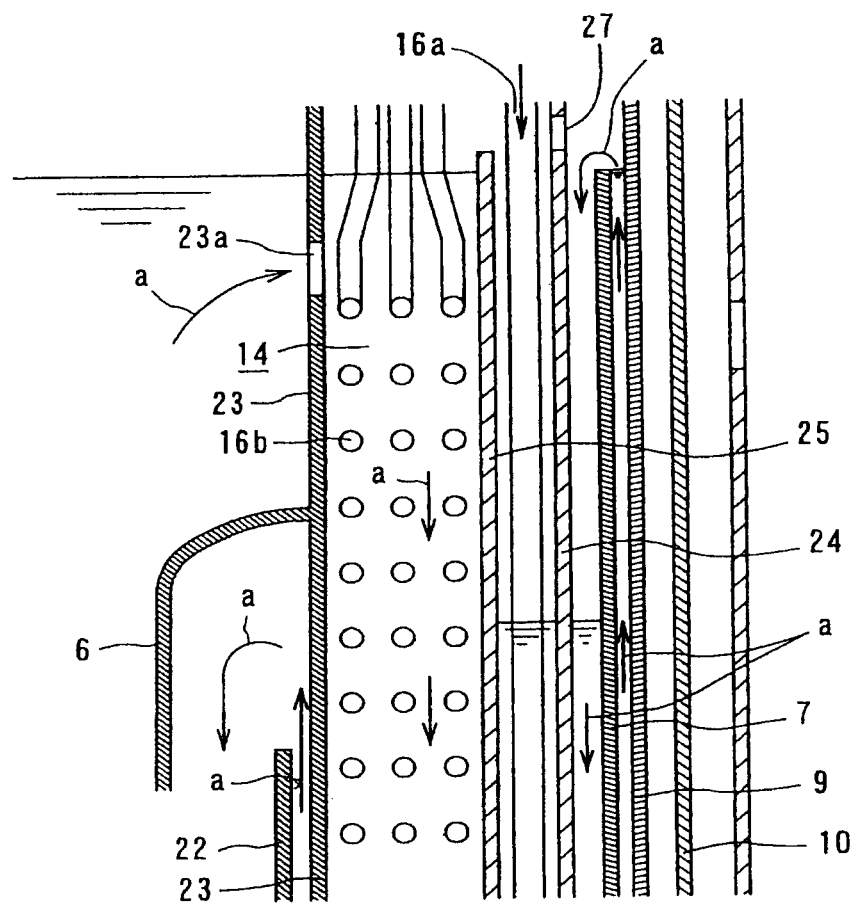
FIG. 3 is an enlarged view illustrating a portion B shown in FIG. 1.

On the other hand, as shown in FIG. 3, water used as a secondary coolant flows into the tube side of the steam generator 14. In detail, the water flowing via the inlet nozzle 18 enters into downcomer tubes 16a in the heat transfer tubes 16 to flow downwardly in the axial direction thereof.

Then, the water enters into a tube side, that is, heat transfer tubes (riser tubes) 16b which are arranged in layers to flow upwardly through the heat transfer tubes 16b in the axial direction thereof.

Therefore, the primary coolant flows upwardly through the shell side of the steam generator 14 and the water flows upwardly through the tube side (heat transfer tubes 16b) thereof so that heat in the primary coolant is transferred into the water in the steam generator 14, and thereafter, is discharged from the lower end portion thereof.

The discharged primary coolant passes through the coolant passage 5 on the lower side of the steam generator 14 to enter into the coolant passage 5 formed as the space between the inner periphery 23 of the steam generator 14 and the outer periphery 22 of the electromagnetic pump 13, thereby moving upwardly along the coolant passage 5.

The primary coolant flowing out from the coolant passage 5 is sucked from the upper end portion of the electromagnetic pump 13 via the primary coolant passage 5 formed on the upper side thereof, and is again moved downwardly by the operation of the electromagnetic pump 13.

On the other hand, after the water is heated by the primary coolant in the -heat transfer tubes 16b of the steam generator 14, the water flowing through the outlet nozzle 19 flows out, as a steam, to the outside of the nuclear reactor 1 (reactor vessel 9) so that a thermal power that the steam has is converted into an electric power or the like.

In this first embodiment, a decay heat after the shutdown of the reactor 1 is passed through the steam generator 14 via a turbine bypass system to be removed by a condenser and a natural radiation of the reactor 1.

As described above, according to the liquid metal cooled nuclear reactor 1 of this first embodiment, the all elements required for cooling the core 2 by using the liquid metal, such as the core reactor barrel 3, the reflector 4, the partition wall structure having the inner partition wall 6 and the outer partition wall 7, the neutron shield 8, the electromagnetic pump 13 and the steam generator 14 are contained in the reactor vessel 9. Therefore, it is possible to make small a heat value dispersed to the outside of the reactor 1, thereby improving the heat efficiency thereof.

Furthermore, according to the liquid metal cooled nuclear reactor 1 of this first embodiment, it is possible to make compact the whole size of the reactor vessel 9, thereby reducing a possibility of leaking the liquid metal from the reactor vessel 9.

Still furthermore, according to the nuclear reactor 1, because the steam generator 14 is provided in the reactor vessel 9 without providing therein an intermediate heat exchanger, it is also possible to make reduce the scale of the power plant (reactor system) using the nuclear reactor 1, and to reduce the cost of manufacturing the reactor system (power plant).

In addition, according to the nuclear reactor 1 according to the first embodiment, because the electromagnetic pump 13 is arranged so as to be included in the downstream side of the steam generator 14 so that the upper portion of the electromagnetic pump 13 and the lower portion of the steam generator 14 is overlapped in the axial direction thereof, as compared with the conventional liquid metal cooled reactor having the structure that the intermediate heat exchanger and the electromagnetic pump are vertically arranged in series, it is possible to make small the length of the reactor 1 in the axial direction thereof so as to prevent the reactor 1 from being oscillated, thereby making the reactor 1 stable.

Next, the following is a description on the details of the liquid metal cooled nuclear reactor 1 of the first embodiment.

As shown in FIG. 1, the steam generator 14 and the electromagnetic pump 13 are constructed integrally with an upper structural member 15 of the reactor 1. The upper structural member 15 is used for suspending the steam generator 14 and the electromagnetic pump 13 together. The outer shell 24 of the steam generator 14 forms an outer shroud of the structural member 15. A seal structural member 17 comprising a piston ring or the like is interposed between the upper end portion of the inner partition wall 6 and the lower end portion of the electromagnetic pump 13. The seal structural member 17 is adapted to absorb expansion and shrinkage of the liquid metal cooled nuclear reactor 1 due to heat generated thereby so as to define the coolant passage 5.

Moreover, the upper structural member 15 has a structure of integrally suspending the steam generator 14 and the electromagnetic pump 13. The expansion and shrinkage of the upper structural member 15 by thermal expansion with the operation of reactor 1 is absorbed by the seal structural member 17. A structural portion for supporting the core 2 is provided at the bottom portion of the reactor vessel 9 via the base plate 12, and the expansion and shrinkage of the reactor vessel 9 and the core 2 by heat is absorbed by the seal structural member 17.

As a result, it is possible to disperse a weight loaded onto the reactor vessel 9. Moreover, the upper portion of the core 2 is a hollow space so that it is possible to perform a work of exchanging the core 2 without removing the electromagnetic pump 13 and the steam generator 14.

Therefore, according to the first embodiment, in addition to the effect for making compact the reactor vessel 9 into a small size, it is possible to perform the work of exchanging the core 2 without removing the electromagnetic pump 13 and the steam generator 14. Moreover, the upper structural member 15 is provided for the reactor vessel 9 so that the upper structural member 15, the electromagnetic pump 13 and the steam generator 14 are permitted to be integrally removed therefrom, making it possible to improve the transportation and the installation of the reactor vessel 9.

Figure 4:
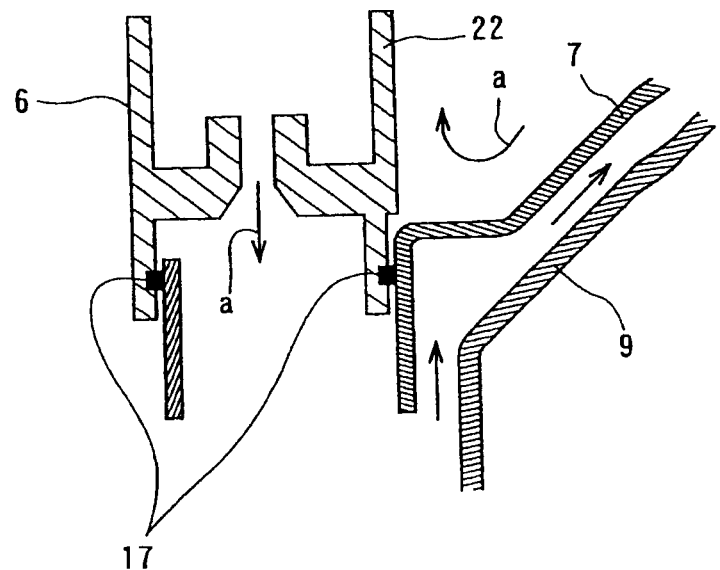
FIG. 4 is an enlarged view illustrating a portion C shown in FIG. 1.
Figure 5:
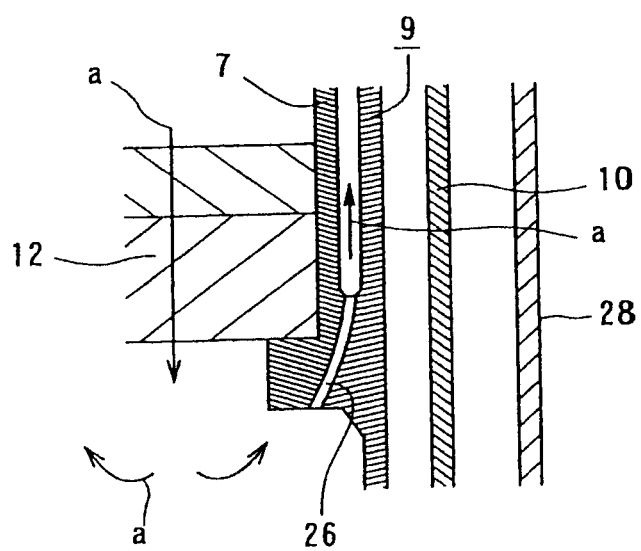
FIG. 5 is an enlarged view illustrating a portion D shown in FIG. 1.

Subsequently, the liquid metal cooled nuclear reactor 1 will be more detailedly explained below with reference to FIG. 3 to FIG. 5. FIG. 3, FIG. 4 and FIG. 5 are enlarged views of the portions B, C and D shown in FIG. 1, respectively. Especially, FIG. 3 illustrates a state of a liquid surface of the primary coolant contained in the reactor vessel 9 when the reactor 1 is operated. In FIG. 3, FIG. 4 and FIG. 5, a solid line arrow "as" shows a flowing direction of the primary coolant when the reactor 1 is operated in the first embodiment.

As shown in FIG. 5, a plurality of bypass passages 26 are formed on the structural portion supporting the base plate 12 on which the core 2 is placed, at the lower portion of the reactor vessel 9. These bypass passages 26 communicate with an annular space defined between the outer partition wall 7 and the reactor vessel 9, and the upper end portion of the outer partition wall 7 is opened in the upper space of the reactor vessel 9.

As shown by these arrows "a", the primary coolant moves downward by the operation of the electromagnetic pump 13, and then, flows downwardly through the inside of the neutron shield 8 so as to enter into the bottom portion of the reactor vessel 9.

Next, most of the primary coolant is moved upwardly while flowing through the core 2 and being heated therein, and after that, flows into the shell side of the steam generator 14 at the upper portion of the reactor vessel 9.

On the other hand, a part of the primary coolant flows into the annular space between the reactor vessel 9 and the outer partition wall 7 via the plurality of bypass passages 26 formed on the structural portion supporting the base plate 12, as shown in FIG. 5. The primary coolant moving up via the annular space flows over the upper end portion of the outer partition wall 7 to invert thereat, as shown in FIG. 3, and then, flows into an annular space formed between the outer partition wall 7 and the outer shell 24 of the steam generator 14. Because the primary coolant is in a low temperature state before flowing into the core 2, and is moved upwardly while cooling the whole of the reactor vessel 9, it is possible to keep, by securing a flow rate of the primary coolant, a wall surface of the reactor vessel 9 at a low temperature.

Therefore, according to the first embodiment, in the operation of the reactor 1, the whole of the reactor vessel 9 is maintained at a low temperature, and thereby, it is possible to secure a structural safety of the reactor vessel 9, and to make an operation for a long period while reducing a possibility of leaking a liquid metal.

Figure 6:
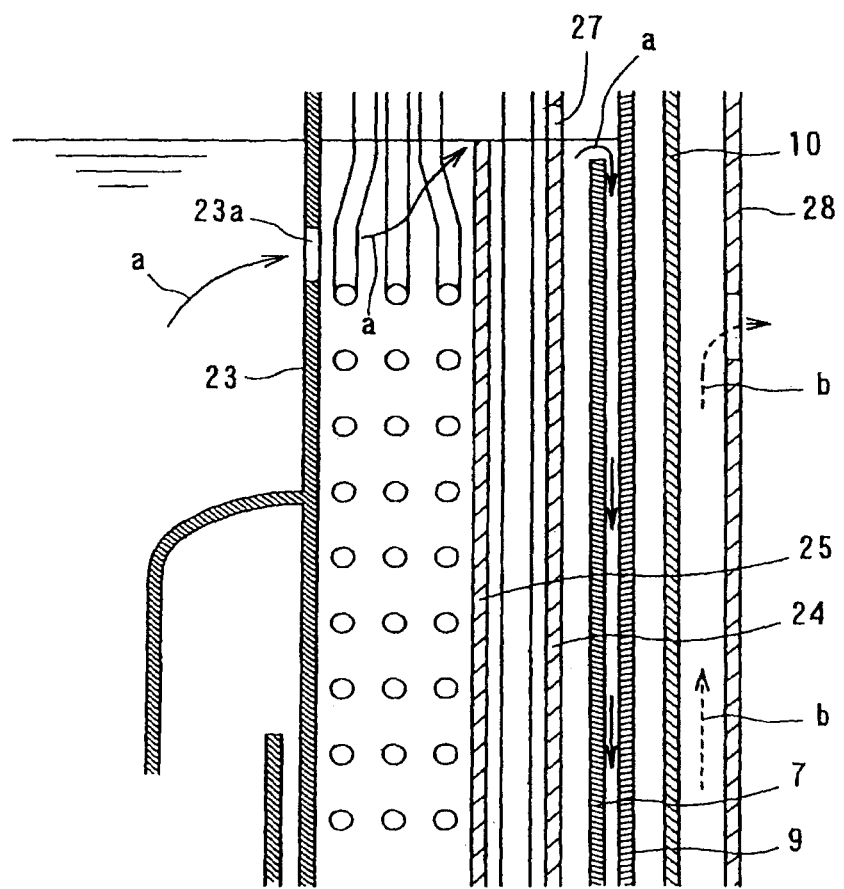
FIG. 6 is an enlarged view illustrating the portion B shown in FIG. 1 to explain an operation when removing decay heat.
Figure 7:
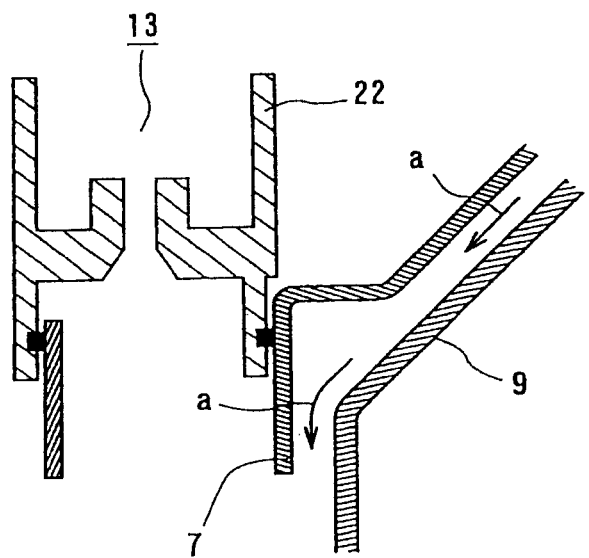
FIG. 7 is an enlarged view illustrating the portion C shown in FIG. 1 to explain the operation when removing decay heat.
Figure 8:
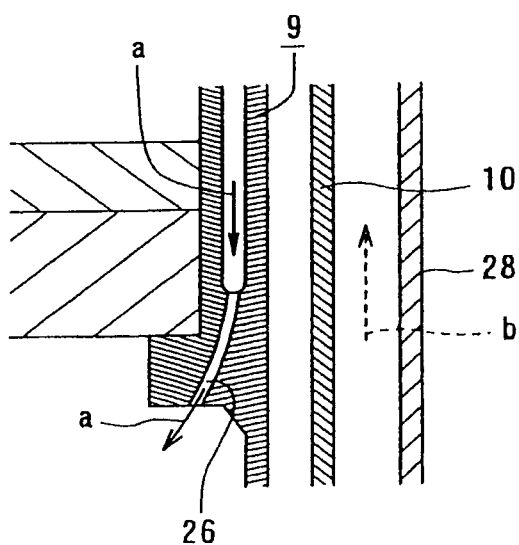
FIG. 8 is an enlarged view illustrating the portion D shown in FIG. 1 to explain the operation when removing decay heat.

Next, a decay heat removal operation will be described below with reference to FIG. 6 to FIG. 8. FIG. 6, FIG. 7 and FIG. 8 are correspondent to FIG. 3, FIG. 4 and FIG. 5, respectively. In FIG. 3, FIG. 4 and FIG. 5, the solid line arrows "a" show flowing directions of the primary coolant when removing a decay heat in this first embodiment, and broken line arrows "b" show flowing directions of air which flows in the reactor 1 through an inlet port to flow out from an outlet port.

As shown in FIG. 6, the steam generator 14 has an intermediate shell 25 arranged between the inner shell 23 and the outer shell 24 for partitioning heat exchange portions (the heat transfer tubes 16b) and downcomer portions (the downcomer tubes 16a). An upper end portion of the intermediate shell 25 is projected to have a height which is higher than a liquid surface of the primary coolant in the reactor vessel 9 in a normal operation of the reactor 1.

The outer shell 24 is formed with an opening portion (outer shell opening portion) 27 at a position higher than the liquid surface of the reactor vessel 9 in the normal operation of the reactor 1. Moreover, an air duct 28 is arranged to surround the outer periphery of the guard vessel 10 at a predetermined space.

Moreover, the inner shell 23 of the steam generator 14 is formed at its a predetermined portion with an opening window 23a, and the predetermined portion of the opening window 23a is lower than the position of the opening portion 27 of the intermediate shall 25.

In the operation of the reactor 1 shown in FIG. 3, the primary coolant heated by the core 2 flows upwardly through the upper portion of the reactor vessel 9 into the shell side of the steam generator 14. When the primary coolant flows in the shell side thereof, a liquid surface on the shell side of the steam generator 14 is the same as the liquid surface of the reactor vessel 9 on the assumption that a pressure loss of the opening window 23a may be ignored. The upper end portion of the intermediate shell 25 is projected to have the height which is higher than the liquid surface of the reactor vessel 9 in the normal operation of the reactor 1 so that it is possible to prevent the primary coolant from flowing into the downcomer tubes 16a in the heat transfer tubes 16, which are formed between the intermediate shell 25 and the outer shell 24, thereby preventing a reduction of heat efficiency of the steam generator 14.

On the contrary, as shown in FIG. 6, in an operation of the reactor 1 when removing a decay heat, the liquid metal used as the primary coolant is expanded in its volume by a rise of its temperature so that the primary coolant flows over from the upper end portion of the intermediate shell 25 to flow into the annular space formed between the reactor vessel 9 and the outer partition wall 7 via the opening portion 27 formed in the outer shell 24. The primary coolant flows down through the annular space formed between the reactor vessel 9 and the outer partition wall 7, while, simultaneously, making a heat exchange with the air, shown by the arrow "b", moving upwardly through the annular space formed between the guard vessel 10 and its outer periphery of the air duct 28 via a wall surface of the reactor vessel 9 and the wall surface of the guard vessel 10.

Thereafter, as shown in FIG. 8, the primary coolant flows into the bottom portion of the reactor vessel 9 via the plurality of bypass passages 26 formed at the structural portion supporting the base plate 12 for placing the core 2. The primary coolant flowing into the bottom portion of the reactor vessel 9 and having a low temperature is sucked by a natural circulating force based on the heating in the core 2 so as to flow thereinto.

Therefore, in the first embodiment, in the normal operation of the reactor 1, it is possible to highly maintain the heat efficiency of the steam generator 14, and in addition to the effect, after the shutdown of the reactor 1, it is possible to perform the operation of the reactor 1 when removing the decay heat by effectively using a natural circulating force caused by a heat generated in the core 2 and a radiation from the wall surface of the reactor vessel 9. Therefore, it is able to surely perform the removal of decay heat in the reactor 1 itself, making it possible to secure a structural safety of the reactor vessel 9, to make an operation of the reactor 1 for a long period while eliminating a probability of leaking the liquid metal.

Second Embodiment (FIG. 9 to FIG. 14)

Figure 9:
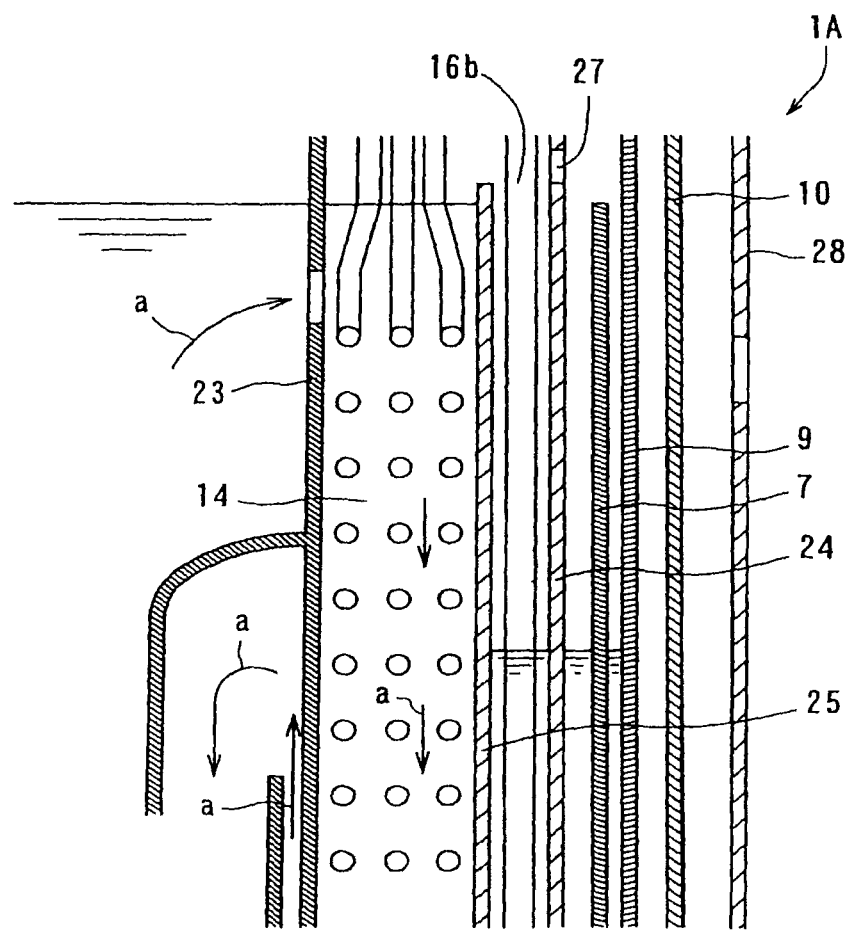
FIG. 9 is a view corresponding to FIG. 3 according to a second embodiment of the present invention.
Figure 10:
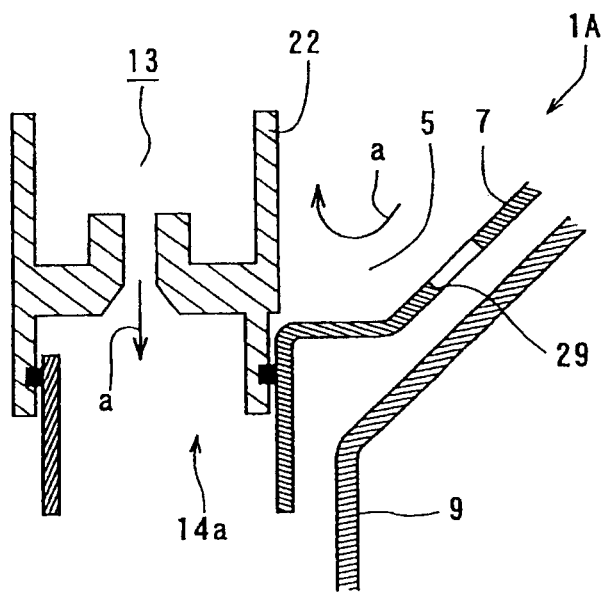
FIG. 10 is a view corresponding to FIG. 4 according to the second embodiment of the present invention.
Figure 11:
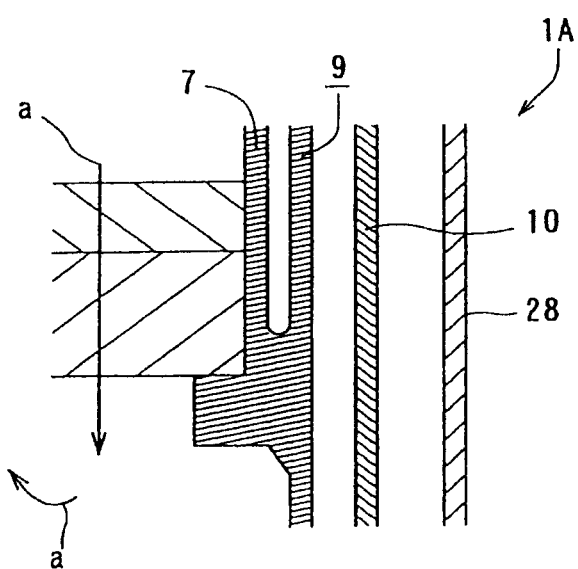
FIG. 11 is a view corresponding to FIG. 5 according to the second embodiment of the present invention.
Figure 12:
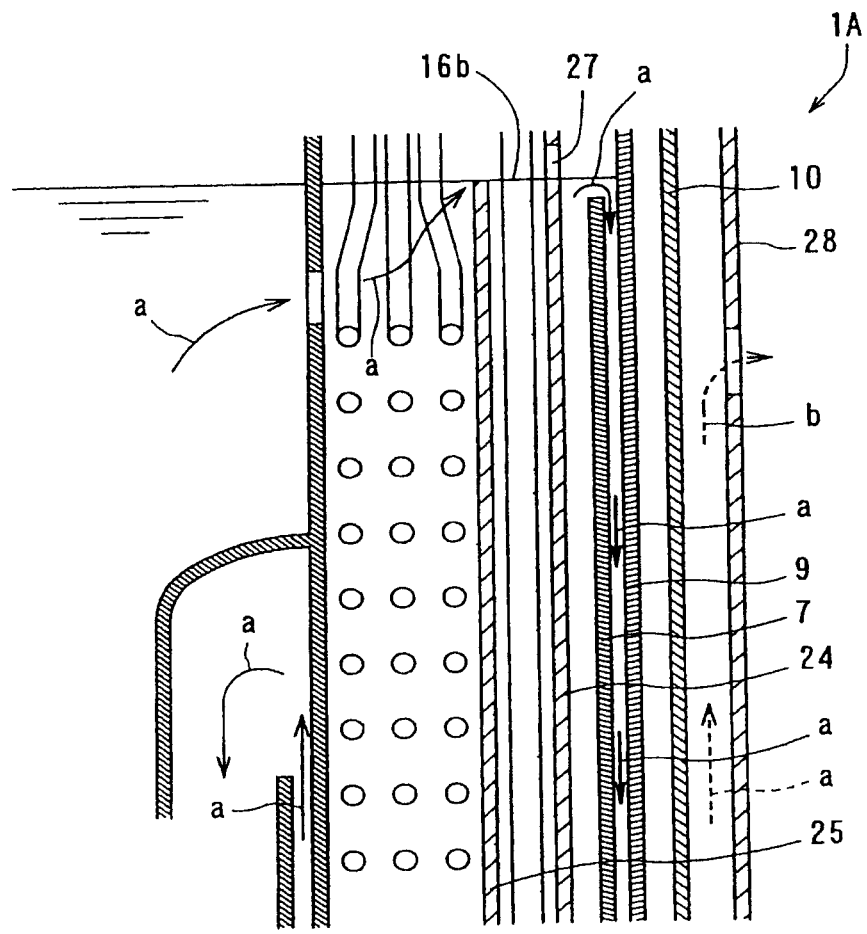
FIG. 12 is a view corresponding to FIG. 6 according to the second embodiment of the present invention.
Figure 13:
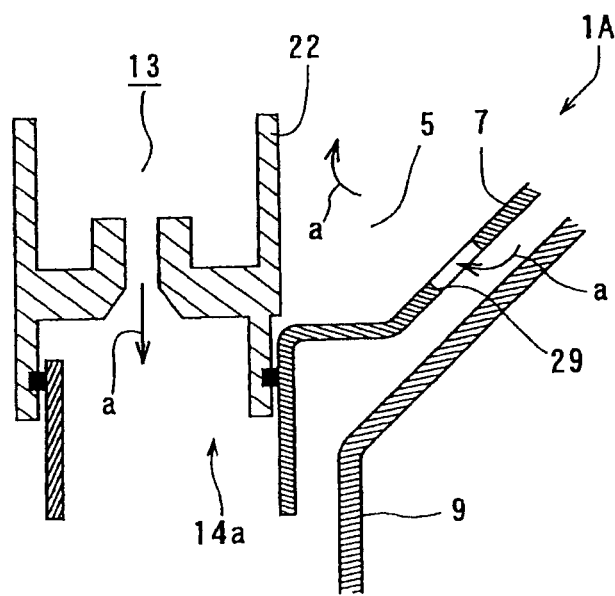
FIG. 13 is a view corresponding to FIG. 7 according to the second embodiment of the present invention.
Figure 14:
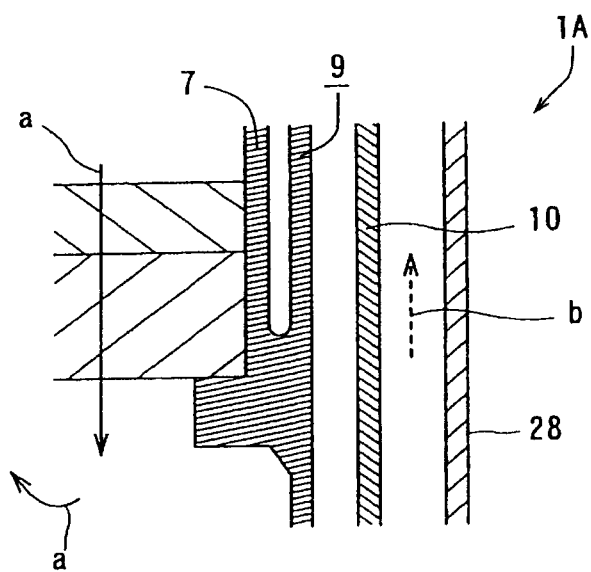
FIG. 14 is a view corresponding to FIG. 8 according to the second embodiment of the present invention.

FIG. 9 to FIG. 14 illustrate a second embodiment of the present invention. FIG. 9, FIG. 10 and FIG. 11 are correspondent to FIG. 3, FIG. 4 and FIG. 5, respectively, which show a state of a liquid surface and a flow of primary coolant in an operation of the reactor. FIG. 12, FIG. 13 and FIG. 14 are correspondent to FIG. 3, FIG. 4 and FIG. 5, respectively, and show an operation in the removal of decay heat. In FIG. 9 to FIG. 14, solid line arrows "a" show flowing directions of the primary coolant, and broken lines arrow "b" show flowing directions of air.

A liquid metal cooled nuclear reactor 1A of this second embodiment has basically the same structure as that of the above first embodiment and therefore, the overlapping explanation is omitted with reference to FIG. 1 and FIG. 2.

In this second embodiment, as shown in FIG. 11 and FIG. 14, no bypass passage of the first embodiment is formed on a structural portion supporting the base plate 12 placing the core 2 at the lower portion of the reactor vessel 9. On the other hand, as shown in FIG. 10 and FIG. 13, the outer partition wall 7 is formed with a plurality of opening portions 29 in the vicinity of an outlet bottom portion 14a of the steam generator 14.

According to the above structure of the reactor 1A, in the normal operation of the reactor 1A, as shown by the arrows "a" in FIG. 9 to FIG. 11, the primary coolant moves downward by the operation of the electromagnetic pump 13, and then, flows downwardly through the inside of the neutron shield 8 so as to enter into the bottom portion of the reactor vessel 9. Next, the primary coolant moves upwardly while flowing through the core 2 and being heated therein, and after that, flows into the shell side of the steam generator 14 at the upper portion of the reactor vessel 9.

On the assumption that a pressure loss is ignored at the portion of the opening window 23a in the inner shell 23 of the steam generator 14, a liquid surface of the liquid metal in the steam generator 9 is the same as that in the reactor vessel 9.

On the other hand, each liquid surface of the space between the intermediate shell 25 of the steam generator 14 and the outer shell 24 thereof, the space between the outer shell 24 and the outer partition wall 7, and the space between the outer partition wall 7 and the reactor vessel 9, is as follows.

More specifically, each liquid surface of these spaces is lower than the liquid surface of the reactor vessel 9 by the pressure loss on the shell side of the steam generator 14 in the normal operation, and becomes the same liquid level.

Each primary coolant in the space between the intermediate shell 25 and the outer shell 24, the space between the outer shell 24 and the outer partition wall 7, and the space between the outer partition wall 7 and the reactor vessel 9, is as follows. More specifically, in the normal operation of the reactor 1A, the primary coolant in each space gets to be an equilibrium temperature state by heat balance of an heat input from the inside of the reactor vessel 9 and a heat radiation to the air side via the reactor vessel 9 and the guard vessel 10.

As a result, it is possible to protect a wall surface of the reactor vessel 9 from a rapid heat transit by a change of operating mode of the reactor 1A.

Moreover, in the operation of the reactor 1A while removing decay heat, as shown by the arrows "a" in FIG. 12 to FIG. 14, the primary coolant flows over from the upper end portion of the intermediate shell 25 due to a volume expansion of the liquid metal by the rise of its temperature so that the primary coolant flows into the annular space formed between the reactor vessel 9 and the outer partition wall 7 via the opening portion 27 formed in the outer shell 24. The primary coolant gets to have a high temperature by a decay heat of the core 2, and then, flows into the annular space formed between the reactor vessel 9 and the outer partition wall 7, while, as shown by the arrow "b" in FIG. 14, making a heat exchange with the air moving upwardly through the annular space formed between the guard vessel 10 and the air duct 28 surrounding the outer periphery thereof via the wall surface of the reactor vessel 9 and the wall surface of the guard vessel 10.

Thereafter, the primary coolant flows into the coolant passage 5 at the bottom portion of the steam generator 14 via the opening portions 29 formed in the outer partition wall 7 in the vicinity of the bottom portion on the outlet of the steam generator 14. Namely, the primary coolant flowing into the coolant passage 5 contributes mainly to the removal of decay heat in the wall surface of the reactor vessel 9 positioning on the outer peripheral portion of the steam generator 14.

After passing through the coolant passage 5 at the bottom portion of the steam generator 14, the primary coolant is moved upwardly along an elongated portion of the coolant passage 5 formed as the space between the inner peripheral portion of the inner shell 23 of the steam generator 14 and the outer peripheral portion of the outer shell of the electromagnetic pump 13. Then, the primary coolant is sucked from the upper end portion of the electromagnetic pump 13 via the primary coolant passage 5 formed at the upper portion of the electromagnetic pump 13 so as to flow through the electromagnetic pump 13, thus to be guided downwardly. Furthermore, the primary coolant passing through the neutron shield 8 to flow into the bottom portion of the reactor vessel 9, which has a low temperature, is sucked by a natural circulating force based on heat generation in the core 2 to flow thereinto.

As described above, according to this second embodiment, it is possible to protect the wall surface of the reactor vessel 9 from a rapid heat transit by a change of the operation mode of the reactor 1A, and to secure a structural safety of the reactor vessel 9, to make an operation of the reactor 1A for a long period while eliminating a probability of leaking the liquid metal.

Incidentally, in this second embodiment, various modifications may be made. For example, the outer partition wall 7 shown in FIG. 9 to FIG. 11 may have a structure of removing the upper portion thereof from the vicinity of the bottom portion on the outlet of the steam generator 14, or may have a structure of forming no opening portion 29 of the outer partition wall 7.

According to the above structures of the modifications, in the normal operation of the reactor according to the modifications, the primary coolant moves downward by the operation of the electromagnetic pump 13, and then, flows downwardly through the inside of the neutron shield 8 so as to enter into the bottom portion of the reactor vessel 9. Next, the primary coolant moves upwardly while flowing through the core 2 and being heated therein, and after that, flows into the shell side of the steam generator 14 at the upper portion of the reactor vessel 9.

Each primary coolant in the space between the intermediate shell 25 and the outer shell 24, the space between the outer shell 24 and the outer partition wall 7, and the space between the outer partition wall 7 and the reactor vessel 9, gets to be an equilibrium temperature state by heat balance of an heat input from the inside of the reactor vessel 9 and a heat radiation to the air side via the reactor vessel 9 and the guard vessel 10. Furthermore, the primary coolant existing in the space between the intermediate shell 25 of the steam generator 14 and the outer shell 24 thereof merely receives an influence by the temperature of the downcomer tubes 16a, that is, a temperature of the water supplied to the downcomer tubes 16a so that the wall surface of the reactor vessel 9 is maintained at a relatively low temperature, and therefore, it is possible to protect a wall surface of the reactor vessel 9 from a rapid heat transit by a change of the operating mode of the reactor.

On the other hand, in the operation of the reactor while removing decay heat, according to the modification, the primary coolant flows over from the upper end portion of the intermediate shell 25 due to a volume expansion of the liquid metal by the rise of its temperature so that the primary coolant flows into the annular space formed between the reactor vessel 9 and the outer partition wall 7 via the opening portion 27 formed in the outer shell 24. The primary coolant gets to have a high temperature by a decay heat of the core 2, and then, flows into the annular space formed between the reactor vessel 9 and the outer shell 24, while making a heat exchange with the air moving upwardly through the annular space formed between the guard vessel 10 and the air duct 28 surrounding the outer periphery thereof via the wall surface of the reactor vessel 9 and the wall surface of the guard vessel 10.

After passing through the coolant passage 5 at the bottom portion of the steam generator 14, the primary coolant is moved upwardly along an elongated portion of the coolant passage 5 formed as the space between the inner peripheral portion of the inner shell 23 of the steam generator 14 and the outer peripheral portion of the outer shell of the electromagnetic pump 13. Then, the primary coolant is sucked from the upper end portion of the electromagnetic pump 13 via the primary coolant passage 5 formed at the upper portion of the electromagnetic pump 13 so as to flow through the electromagnetic pump 13, thus to be guided downwardly. Furthermore, the primary coolant passing through the neutron shield 8 to flow into the bottom portion of the reactor vessel 9, which has a low temperature, is sucked by a natural circulating force based on heat generation in the core 2 to flow thereinto.

As described above, according to the modifications of the second embodiment, it is possible to reasonably protect the wall surface of the reactor vessel 9 from a rapid heat transit by a change of the operation mode of the reactor, and to secure a structural safety of the reactor vessel 9, to make an operation of the reactor for a long period while eliminating a probability of leaking the liquid metal.

Figure 15A:
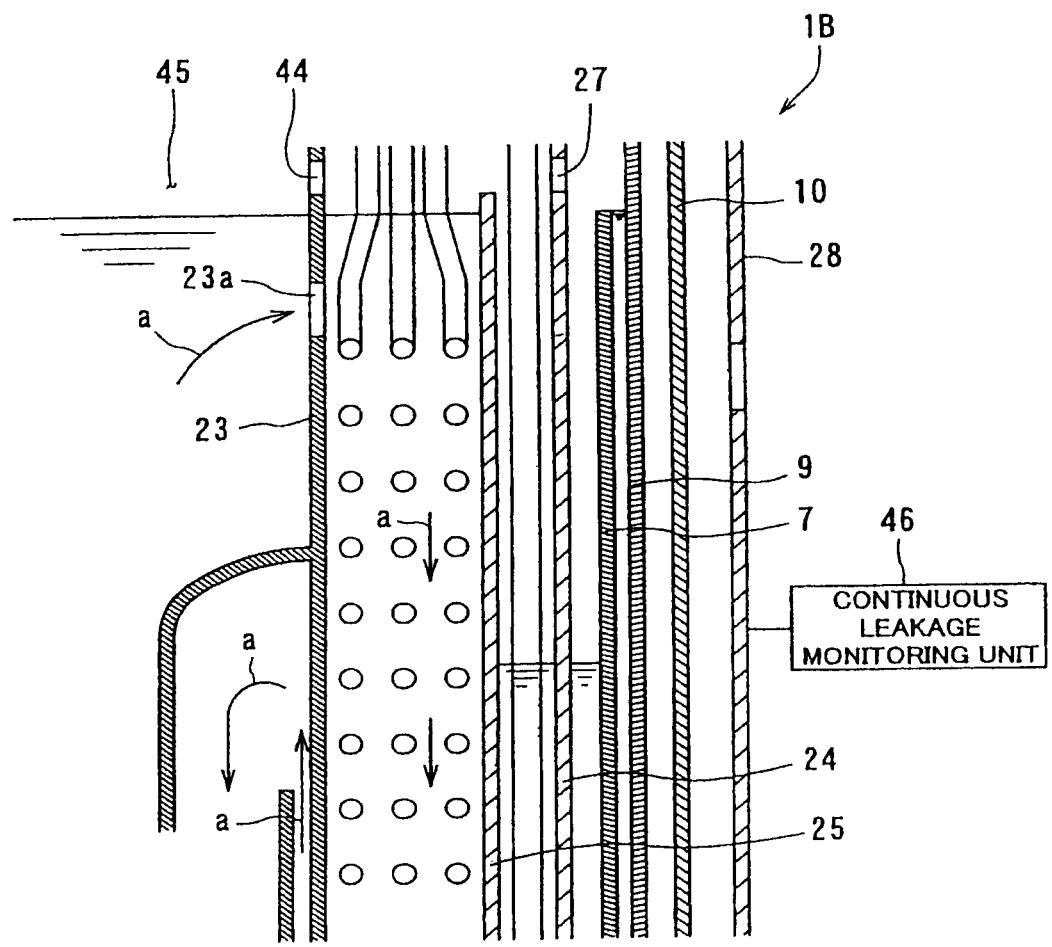
FIG. 15A is a view corresponding to FIG. 3 according to a third embodiment of the present invention.
Figure 15B:
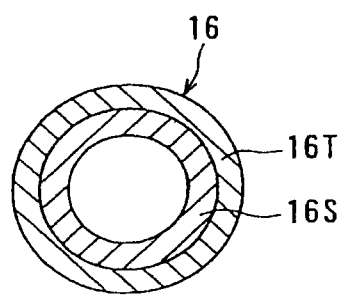
FIG. 15B is an enlarged cross sectional view of a heat transfer tube in FIG. 15A.
Figure 16:
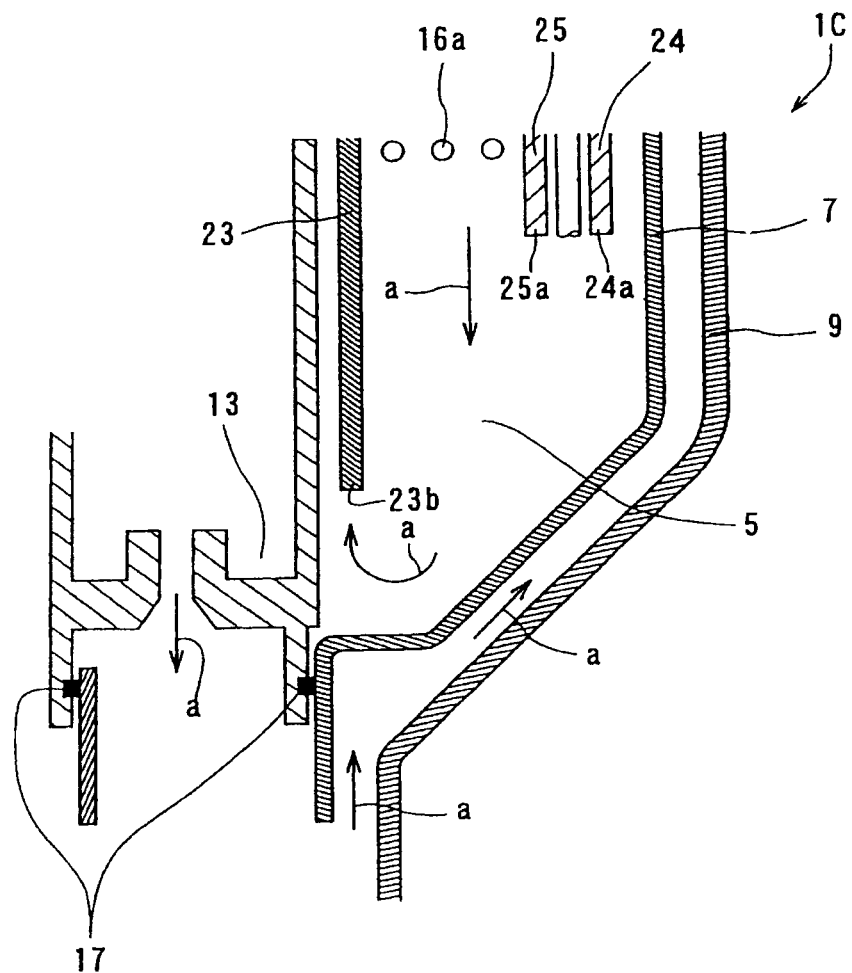
FIG. 16 is a view corresponding to FIG. 4 according to the third embodiment of the present invention.

Third Embodiment (FIGS. 15A, 15B and FIG. 16)

FIGS. 15A, 15B and FIG. 16 show a third embodiment of the present invention. These FIGS. 15A, 15B and FIG. 16 are correspondent to FIG. 3 and FIG. 4 as described before, respectively, and show a liquid surface state and a flow of primary coolant in an operation of reactor. In FIG. 15A and FIG. 16, arrows "a" show flowing directions of the primary coolant. A liquid metal cooled nuclear reactor 1B of this third embodiment basically has the same structure as that of the above first embodiment, and therefore, overlapping explanation is omitted with reference to FIG. 1 and FIG. 2.

The liquid metal cooled nuclear reactor 1B of this third embodiment differs from the above first embodiment in that the steam generator 14 is provided with an opening portion 44 of the inner shell 23 of the steam generator 14, which communicates with a cover gas space 45 of the reactor vessel 9, and is located at the upper portion from the liquid surface of the reactor vessel 9. Moreover, in this third embodiment, each of the heating tubes 16 of the steam generator 14 has a double pipe structure provided with an inner tube 16S and an outer tube 16T surrounding an outer periphery of the inner tube 16S, as shown in FIG. 15B.

In addition, the reactor 1B comprises a continuous leakage monitoring unit 46 that detects a leakage in both outer and inner tubes 16T and 16S. If a large-scale water leakage occurs in a liquid metal by simultaneous breakdown of the double tubes, a water vapor or bubble of the reaction product caused by contacting the liquid metal with the water is transferred to the surroundings from the leakage portion. In this case, in the heat exchange portion, a gas transferred upwardly from the leakage portion flows to a cover gas space of the steam generator 14. On the other hand, a gas transferred downwardly from there flows through each liquid surface of the space between the intermediate shell 25 and the outer shell 24 and the space between the outer shell 24 and the reactor vessel 9 to the cover gas space of the steam generator 14.

At that time, the opening portion 44 of the inner shell 23 operates so that the cover gas space 45 of the reactor vessel 9 communicates with the cover gas space of the steam generator 14. Therefore, the water vapor or bubble of the reaction product by the large-scale water leakage generated in the liquid metal is all guided to the cover gas space 45 of the reactor vessel 9 through the opening portion 44.

In this third embodiment, even if a large-scale water leakage occurs in the heating tube 16 of the steam generator 14, it is possible to maintain a safety of the reactor 1B without mixing the bubble into the core 2.

Incidentally, in the third embodiment, partial modification may be made. For example, as shown in FIG. 16, the lower end portion 23b of the inner shell 23 of the steam generator 14 in the reactor 1C may be arranged at a position lower than the lower end portion 24a of the outer shell 24 thereof and the lower end portion 25a of the intermediate shell 25 in the primary coolant outlet portion of the steam generator 14.

According to the above construction of the modification, if a large-scale water leakage occurs, because the lower end portion 23b of the steam generator inner shell 23 in the primary coolant outlet portion of the steam generator 14 is arranged at the position lower than the lower end portion 25a of the intermediate shell 25 and the lower end portion 24a of the outer shell 24, a gas transferred downwardly of water vapor or reaction product generated by the leakage selectively flows to the upper cover gas space of the steam generator 14 via each liquid surface of the space between the intermediate shell 25 and the outer shell 24 and the space between the outer shell 24 and the reactor vessel 9.

Moreover, the opening portion 44 of the steam generator 23 operates so that the cover has space 45 of the reactor vessel 9 communicates with the cover gas space of the steam generator 14, whereby the water vapor or bubble of the reaction product by the large-scale water leakage generated in the liquid metal is all guided to the cover gas space 45 of the reactor vessel 9.

In this modification of the third embodiment, even if a large-scale water leakage occurs in the heating tube 16 of the steam generator 14, it is possible to maintain a safety of the reactor 1C without mixing bubble into the core 2.

Figure 17:
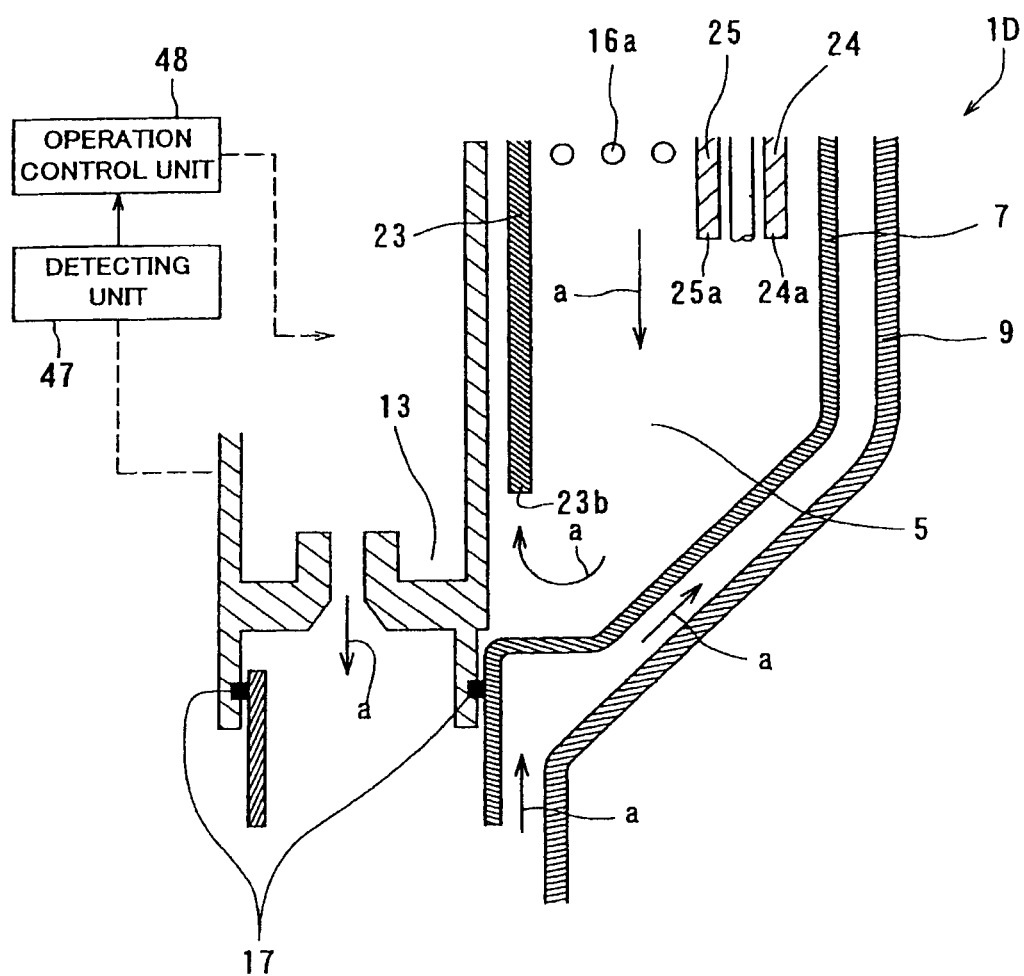
FIG. 17 is a view illustrating a liquid metal cooled reactor according to a modification of the third embodiment.

Furthermore, in this third embodiment, another modification with a construction may be made. More specifically, as shown in FIG. 17, the reactor 1D comprises a detecting unit 47 that detects a peculiar change in flow rate generated due to a pressure rise of the shell side of the steam generator 14 by using a change in a current of the electromagnetic pump 13. In addition, the reactor comprises an operation control unit 48 that performs a control for stopping the operation of the electromagnetic pump 13 by a detected signal outputted from the detecting unit 47. In addition, the lower end portion 23b of the steam generator inner shell 23 is arranged at a position lower than the lower end portion 24a of the outer shell 24 and the lower end portion 25a of the intermediate shell 25.

According to the above construction of the reactor 1D in the another modification, the following operation is carried out. That is, if a water vapor or reaction product gas is generated in the steam generator 14 by a large-scale water leakage, the pressure rise brings about a change in a flow rate of the primary coolant in the steam generator 14. The change in the flow rate of the primary coolant in the electromagnetic pump 13 is detected by the detecting unit 47 via the outlet portion of the steam generator 14 and the coolant passage 5, and then, the electromagnetic pump 13 stopped by the control of the operation unit 47 and, after that, the electromagnetic pump 13 is again operated. In this case, a gas transferred downwardly in the steam generator 14 is transferred selectively to the upward cover gas space thereof via each liquid surface of the space between the intermediate shell 25 and the outer shell 24 and the space between the outer shell 24 and the reactor vessel 9.

Because the lower end portion 23b of the steam generator inner shell 23 is arranged at the position lower than the lower end portion 25a of the intermediate shell 25 and the lower end portion 24a of the outer shell 24.

Moreover, the opening portion 44 of the steam generator 23 operates so that the reactor vessel 9 communicates with the cover gas space 45 of the steam generator 14. Therefore, the water vapor or bubble of the reaction product by the large-scale water leakage generated in the liquid metal is all guided to the cover gas space 45 of the reactor vessel 9 so that, even if a large-scale water leakage occurs in the heating tube 16 of the steam generator 14, it is possible to maintain a safety of the reactor 1D without mixing a bubble into the core 2.

Moreover, another construction of a further modification according to the third embodiment may be made according to the present invention.

For example, the outer tube 16T is arranged at a gap to the outer periphery of the inner tube 16S so that an inert gas such as helium or the like is sealed in the gap. Furthermore, in order to detect a leakage in both inner and outer tubes 16S and 16T, a continuous leakage monitoring unit such as a helium pressure gage, a moisture content concentration monitor or the like, is provided for the reactor according to the modification.

According to the above construction of the reactor in the further modification, the heating tube 16 has a double tube structure, and the continuous leakage monitoring unit detects a leakage in both inner and outer tubes 16S and 16T by the inert gas such as helium or the like sealed in the gap between the inner and outer tubes 16S and 16T so that it is possible to securely prevent a contact of the water in the tubes 16S and 16T with the liquid metal of the shell side of the steam generator 14. Accordingly, with the above construction, because of preventing the water from contacting the liquid metal, it is possible to make a stable operation of the reactor for a long period.

Figure 18:
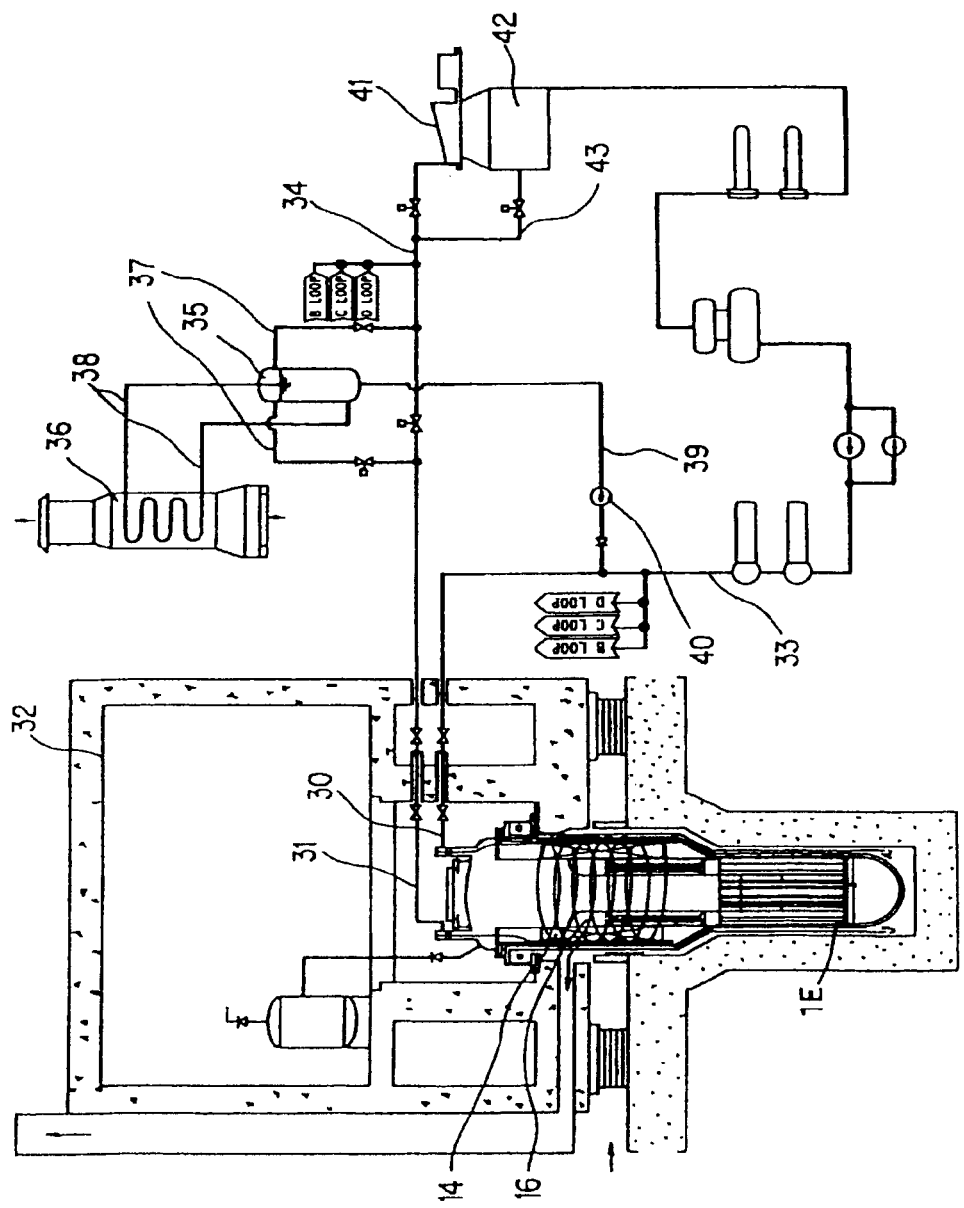
FIG. 18 is a view illustrating a system configuration of a liquid metal cooled nuclear power plant according to a fourth embodiment of the present invention.

Fourth Embodiment (FIG. 18)

FIG. 18 illustrates a liquid metal cooled nuclear power plant according to a fourth embodiment of the present invention.

According to the fourth embodiment, a liquid metal cooled nuclear reactor 1E basically has the same structure as that described in the one of the above embodiments, and therefore, only different points will be described below.

In the liquid metal cooled nuclear reactor 1E of this fourth embodiment, the heat transfer tube 16 of the steam generator 14 shown in FIG. 3 has a double tube structure, as shown in FIG. 15B, and each of the heat transfer tubes 16 is arranged to be formed into a substantially helical shape in the heat exchange portion, in contrast with the above first embodiment. Moreover, an inert gas such as helium or the like is sealed in the space between the inner and outer tubes, and the reactor 1E is provided with a continuous leakage monitoring unit, such as a helium pressure gage, a moisture content concentration monitor, in order to detect a leakage in both inner and outer tubes, similarly to the further modification of the third embodiment.

As shown in FIG. 18, the heat transfer tube 16 of the steam generator 14 is divided into a plurality of heating tube groups, and each heating tube group is connected so as to correspond to feed water and steam branch pipes. A feed water branch pipe 30 and a steam branch pipe 31 penetrate through a reactor container facility 32 independently from each other, and are connected with a feed water pipe 33 and a main steam pipe 34 outside the reactor container facility 32, respectively.

Moreover, in the liquid metal cooled nuclear reactor 1E of this fourth embodiment, a steam separator 35 is provided via a main steam bypass pipe 37 branching from the steam branch pipe 31. The steam separator 35 is provided with an air condenser 36 via a steam auxiliary facility pipe 38. In addition, an auxiliary feed water pipe 39 and an auxiliary feed water pump 40 are provided as a return line to the feed-water side of the steam separator 35.

According to the above construction of the fourth embodiment, in a normal operation of the reactor 1E, water flows into the feed water branching pipe 30 branching and separating from the feed water pipe 33. Then, the water flows into each of the heat transfer tubes 16 of the steam generator 14 in the reactor container facility 32, and thereafter, is heated in the heat exchange portion of each of the heat transfer tubes 16 so as to generate a steam. The steam generated in each of the heat transfer tubes 16 flows into the steam branching pipe 31 together with a steam of the identical heat transfer tube group, and passes through the reactor container facility 32. Thereafter, the steam joins with a steam from the steam branching pipe 31 of another group in the main steam pipe 34, and then, reaches a turbine 41.

In the operation while removing decay heat after stopping the reactor 1E of the fourth embodiment, a steam heated by a decay heat of the reactor 1E flows into the steam branching pipe 31, and passes through the reactor container facility 32. Thereafter, the steam joins with a steam from the steam branching pipe 31 of another group in the main steam pipe 34, and then, reaches a condenser 42 by controlling a valve via a turbine bypass pipe 43. Further, when the steam decreases, the main steam pipe 34 and the turbine bypass pipe 43 are both isolated, and then, the heat of the steam is removed by the air condenser 36 via the steam separator 35 and the steam auxiliary facility pipe 38. In this case, the water condensed by the air condenser 36 passes through the steam separator 35, and then, is driven by the auxiliary feed water pump 40 so as to flow into the feed water branching pipe 30 via the auxiliary feed water pipe 39 and return to a feed-water side of the steam generator 14. In this manner, according to this fourth embodiment, it is possible to improve a reliability of the decay heat removal operation after a shutdown of the reactor 1E.

Therefore, in the nuclear power plant of this fourth embodiment, the heating tube 16 of the steam generator 14 has a double tube structure, and the continuous leakage monitoring unit detects a leakage in both inner and outer tubes of each of the heat transfer tubes. Furthermore, the heating tubes 16 of the steam generator 14 are divided into a plurality of heating tube groups, and the auxiliary cooling air condenser 42 is arranged so as to be independently and correspondingly connected to these heating groups. Therefore, it is possible to securely prevent a contact of the liquid metal with the water, thus making a stable operation of the reactor 1E for a long period.

In addition, even if a failure occurs in one heating tube group or the like, the operation of removing the decay heat of the reactor 1E after a shutdown thereof can be made by other heating tube having no failure and the auxiliary cooling air condenser 42.

As a result, even in the case where the decay heat removal operation after a shutdown of the reactor 1E is not made by the auxiliary cooling air condenser 42, a decay heat can be removed by an operation using a heat radiation via the wall surface of the reactor vessel 9 and a natural circulating force of the primary coolant. Therefore, it is possible to secure a structural safety, and to make an operation of the reactor 1E for a long period, and further, to reduce a possibility of leakage of the liquid metal.

Moreover, in this fourth embodiment, the heating tube 16 of the steam generator 14 has a double tube structure, and each heating tube 16 is formed into a helical shape in the heat exchange portion. Therefore, it is possible to arbitrarily set a dimension of the innermost layer heating tube array, and to readily provide a structure in which the electromagnetic pump 13 is housed inside the steam generator 14. In addition, each heating tube 16 has a double tube structure; therefore, it is possible to reduce a chance of contacting the water in the pipe with the liquid metal on the shell side of the steam generator 14.

Accordingly, in the liquid metal cooled nuclear reactor of this fourth embodiment and the nuclear power plant using the same reactor 1E, it is possible to miniaturize the reactor in its shape, in particular, in its longitudinal direction (axial direction). Further, it is possible to securely prevent a contact of liquid metal with water, and thus to make a stable operation of the reactor for a long period.

Incidentally, in this fourth embodiment, another modifications may be made. More specifically, the heating tube 16 of the steam generator 14 has a single tube structure, and each heating tube 16 is formed into a helical shape in the heat exchange portion. Further, the primary coolant is a liquid metal made of a heavy metal such as lead, lead bismuth or the like. Furthermore, the heating tube 16 of the steam generator 14 is divided into a plurality of heating tube groups, and each heating tube group is connected so as to correspond to feed water and steam branching pipes. The feed water branch pipe 30 and the steam branch pipe 31 penetrate through a reactor container facility 32 independently from each other, and are connected with the feed water pipe 33 and the main steam pipe 34 outside the reactor container facility 32, respectively.

According to the above construction, although the heating tube 16 of the steam generator 14 has a single tube structure, even if a large-scale water leakage by the breakdown of heating tube occurs in a liquid metal and a heavy metal such as lead, lead bismuth or the like contacts with water, there is no of generation of reaction product, and a steam bubble is transferred from the leakage portion to the surroundings. In this case, a specific gravity of heavy metal is about ten times as much as water; therefore, most of gas is transferred upwardly from the leakage portion, and then, is transferred to the cover gas space of the steam generator 14. If the gas is transferred downwardly, the gas is transferred to the upward cover gas space via the liquid surface of the space between the intermediate shell 25 and the outer shell 24 and the space between the outer shell 24 and the reactor vessel 9. In this case, the opening portion 44 of the inner shell 23 of the steam generator 14 operates so that the cover gas space 45 of the reactor vessel 9 communicates with the cover gas space of the steam generator 14. Therefore, a water vapor or bubble of reaction product by a large-scale water leakage generated in the liquid metal is all guided to the cover gas space 45 of the reactor vessel 9, whereby, even if a large-scale water leakage occurs in the heating tube of the steam generator, it is possible to maintain a safety of the reactor without mixing the bubble into the core 2.

Figure 19A:
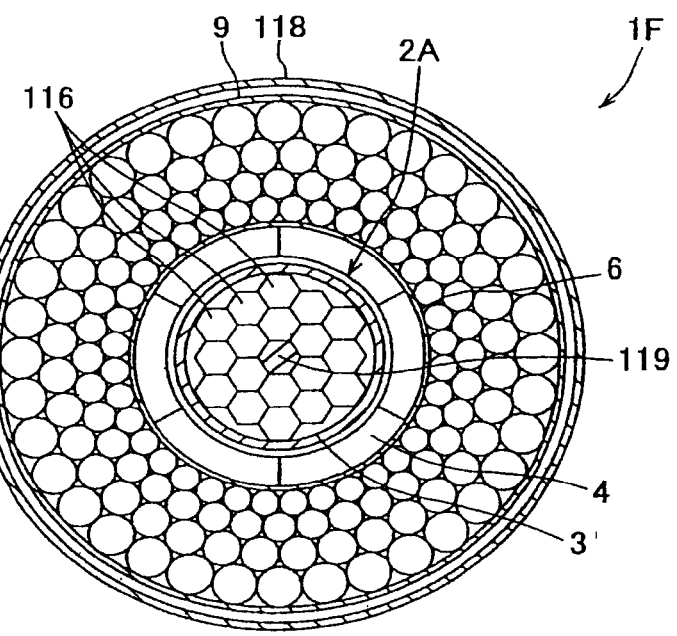
FIG. 19A is a lateral sectional view illustrating a fast reactor according to a fifth embodiment of the present invention.
Figure 19B:
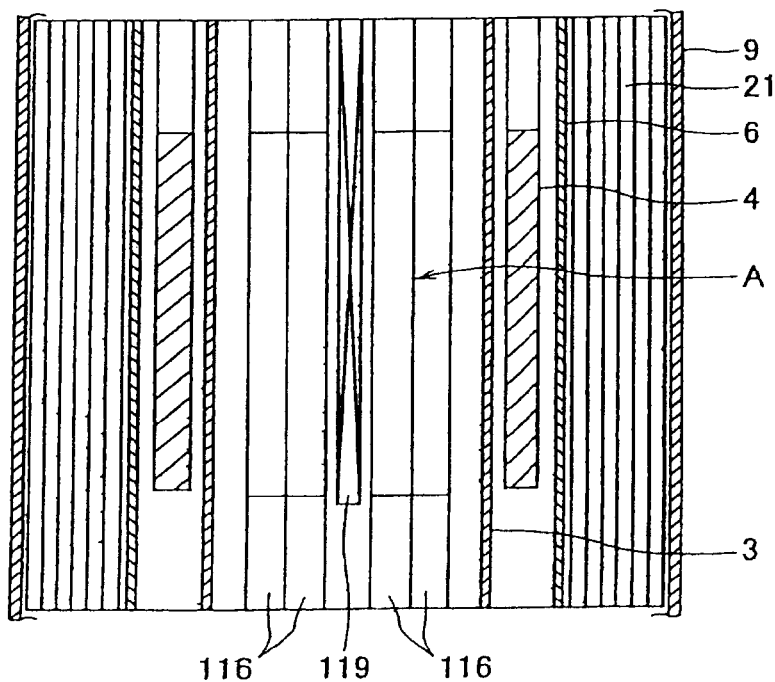
FIG. 19B is a longitudinal sectional view schematically illustrating the fast reactor in FIG. 19A.
Figure 20:
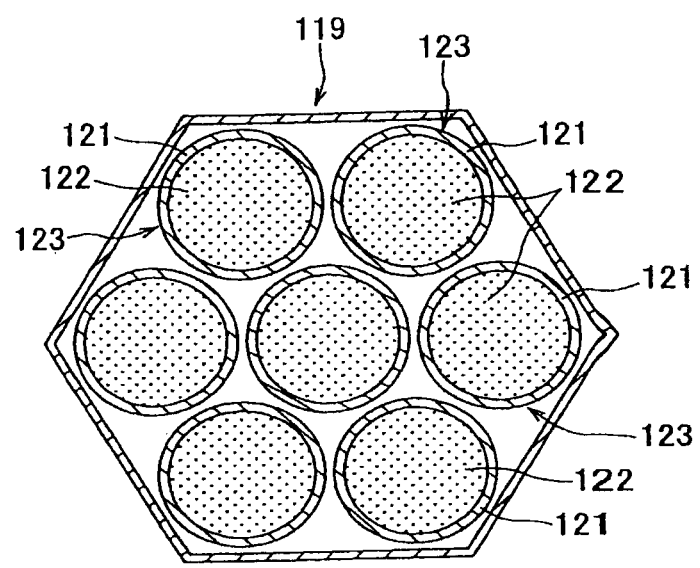
FIG. 20 is a lateral sectional view illustrating a reactivity control assembly in FIG. 19A and FIG. 19B.
Figure 21:
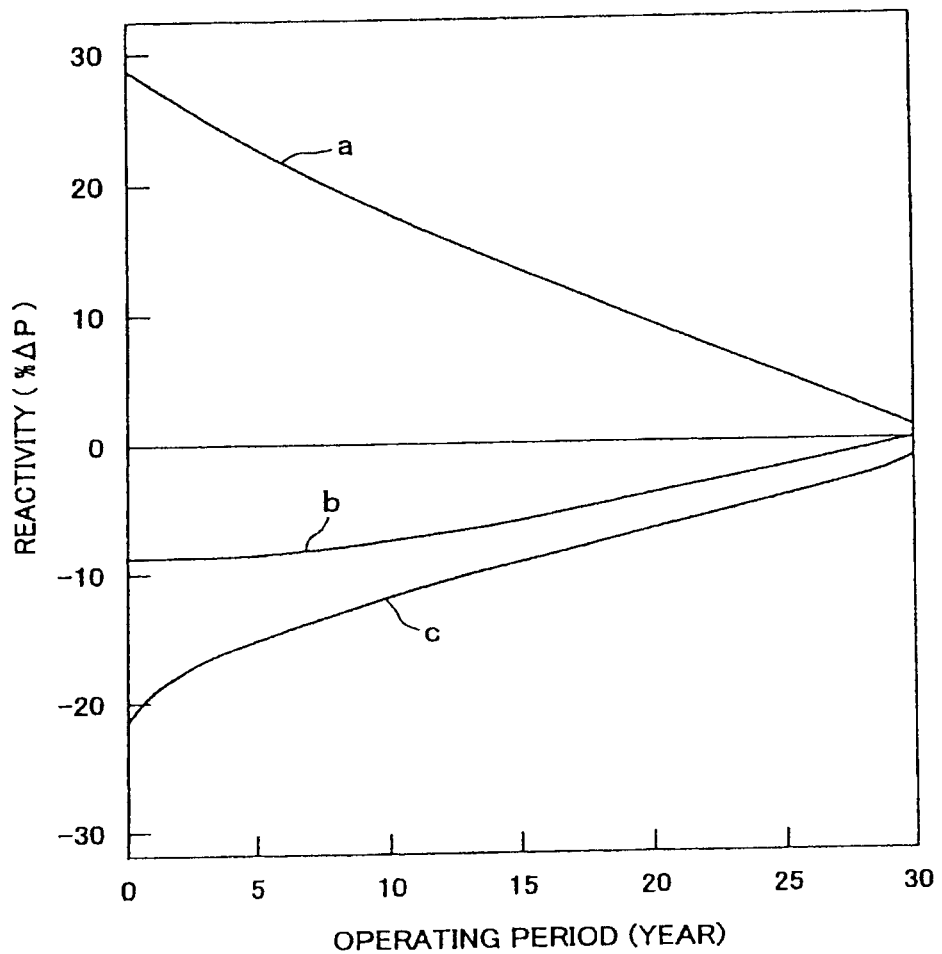
FIG. 21 is a characteristic diagram to explain an operation of the fast reactor according to the fifth embodiment of the present invention.

Fifth Embodiment (FIG. 19 to FIG. 21)

With reference to FIG. 19A, FIG. 19B, FIG. 20 and FIG. 21, a liquid metal cooled reactor according to the fifth embodiment of the present invention is a fast reactor 1F corresponding to the liquid metal cooled reactor 1 according to the first embodiment, and the fast reactor 1F has substantially the same structure of the reactor 1 except for the core 2A.

Therefore, only the structure and operation of the reactor core 2A are described hereinafter, and other elements of the fast reactor 1F are assigned to the same numerals of the reactor 1 so that the descriptions of the elements and the operations thereof are omitted.

As shown in FIGS. 19A and 19A, the core 2A is composed of nuclear fuel assemblies 116 which are arranged to be formed into a substantially cylindrical shape and a reactivity control assembly 119 arranged at a center portion of the fuel assemblies 116 and adapted to control the reactivity of the core 2A.

In this fifth embodiment, as shown in FIG. 19, each of the fuel assemblies 116 has a hexagonal shape in its lateral cross section and the core 2A has a diameter with approximately 80 cm and an effective length thereof with approximately 200 cm.

The neutron reflector 4 outside the core 2A is composed of a structural member such as stainless steel (SUS) or graphite including a cover gas space, and has a longitudinal length of approximately 200 cm and a thickness of about 15 cm.

Incidentally, these measurements of the core 2A are one example of the core 2A.

The partition wall 6 is arranged outside the neutron reflector 4, and the neutron shield 21 is arranged outside the partition wall 6, and further, the reactor vessel 9 is arranged outside the neutron shield 21, as described in the first embodiment of the present invention.

The reactivity control assembly 119 is mounted at the center portion of the core 2A (the fuel assemblies 116).

The reactivity control assembly 119 contains a mixture made by mixing neutron moderator, for example, zirconium hydride and neutron absorber, for example gadolinium.

The reactivity control assembly 119 comprises, as shown in FIG. 20, a wrapper tube 120 with a hexagonal shape in its lateral cross section, and a plurality of neutron absorber rods 123, for example, seven neutron absorber rods 123 assembled to be contained therein. Each of the neutron absorber rods 123 has a cladding tube 121 and a mixture 122 which is produced by mixing a neutron moderator and a neutron absorber and is filled therein.

The volume percent ratio of the neutron moderator and the neutron absorber in the mixture 122 is X to Y, wherein the X percent is bigger than the Y percent.

The cladding tube 121 is made of a structural material such as a stainless steel or the like, and the mixture 122 of the neutron moderator and the neutron absorber is a mixture of zirconium hydride and gadolinium. As the gadolinium, Gd-157, Gd-155 or other similar material are able to be used.

The reactivity control assembly 119, in addition to the functions for absorbing and moderating neutrons irradiated from the fuel assemblies 116, is served as a shutdown rod for a shutdown of the core 2A, and however, the reactivity control assembly 119 is not drawn out from the core 2A in the operation thereof, which is different from a shutdown rod of the conventional core.

Next, the following is a description on an operation of the fifth embodiment.

FIG. 21 shows various reactivity changes in the operating period (the burn-up period) of the core 2A with respect to the final state thereof shown in FIG. 19. In FIG. 21, there are shown a combustion reactivity change "a" of the fuel assembly 116, a value change "b" of the neutron reflector 4, and a reactivity change "c" of the reactivity control assembly 119.

According to FIG. 21, the fuel assembly 116 burned for 30 years has a great excess reactivity change; for this reason, the value change of the neutron reflector 4 can not cancel the excess reactivity of the initial fuel (fuel assembly 116).

Therefore, in the case of a core having the burn-up reactivity as shown in FIG. 21 and a long lifetime of 30 years, neutron doubling is too great in the initial core even if the reactivity of the core is controlled by only the neutron reflector 4 so that no operation of the reactor 1F is performed.

That is, the initial structure of the core greatly exceeds a criticality.

On the contrary, in the fifth embodiment, the reactivity control assembly 119 having a function for absorbing a neutron, for example, gadolinium is contained into the core 2A so that the excessive neutrons irradiated from the core 2A are absorbed in the gadolinium in the reactivity control assembly 119, whereby the initial excess reactivity of the fuel assembly 116 is cancelled, as shown in FIG. 20.

In addition, the gadolinium in the reactivity control assembly 119 is burned to be reduced so that a burn-up reactivity of the fuel is reduced while a reactivity of the reactivity control assembly 119 itself is reduced. Therefore, it is possible to perform a control of burn-up of the core 2A for a long lifetime by a combination of the reactivity change of the neutron reflector 4 by the control of the neutron reflector 4 and the reactivity change of the reactivity control assembly 119.

That is, the core 2A of the reactor 1F operates so that the excess reactivity of the fuel (fuel assembly 116) substantially equals to the sum of the negative reactivity by the neutron reflector 4 and that by the reactivity control assembly 119, whereby the excess reactivity is cancelled by the sum of the negative reactivity by the neutron reflector 4 and the reactivity control assembly 119 so as to keep critical the state of the core 2A Furthermore, in this embodiment, the reactivity control assembly 119 in the core 2A of the fast reactor 1F comprises zirconium hydride used as the neutron moderator mixed with the gadolinium used as the neutron absorber so that it is possible to effectively moderate and absorb the neutrons in the core 2A.

Especially, in this embodiment, it is possible to use the reactivity control assembly 119 to the fast reactor in which neutrons in the core 2A have high energy of 1.00 E+05 (eV), whereas, conventionally, it is hard to use the reactivity control assembly to the fast reactor.

Figure 22:
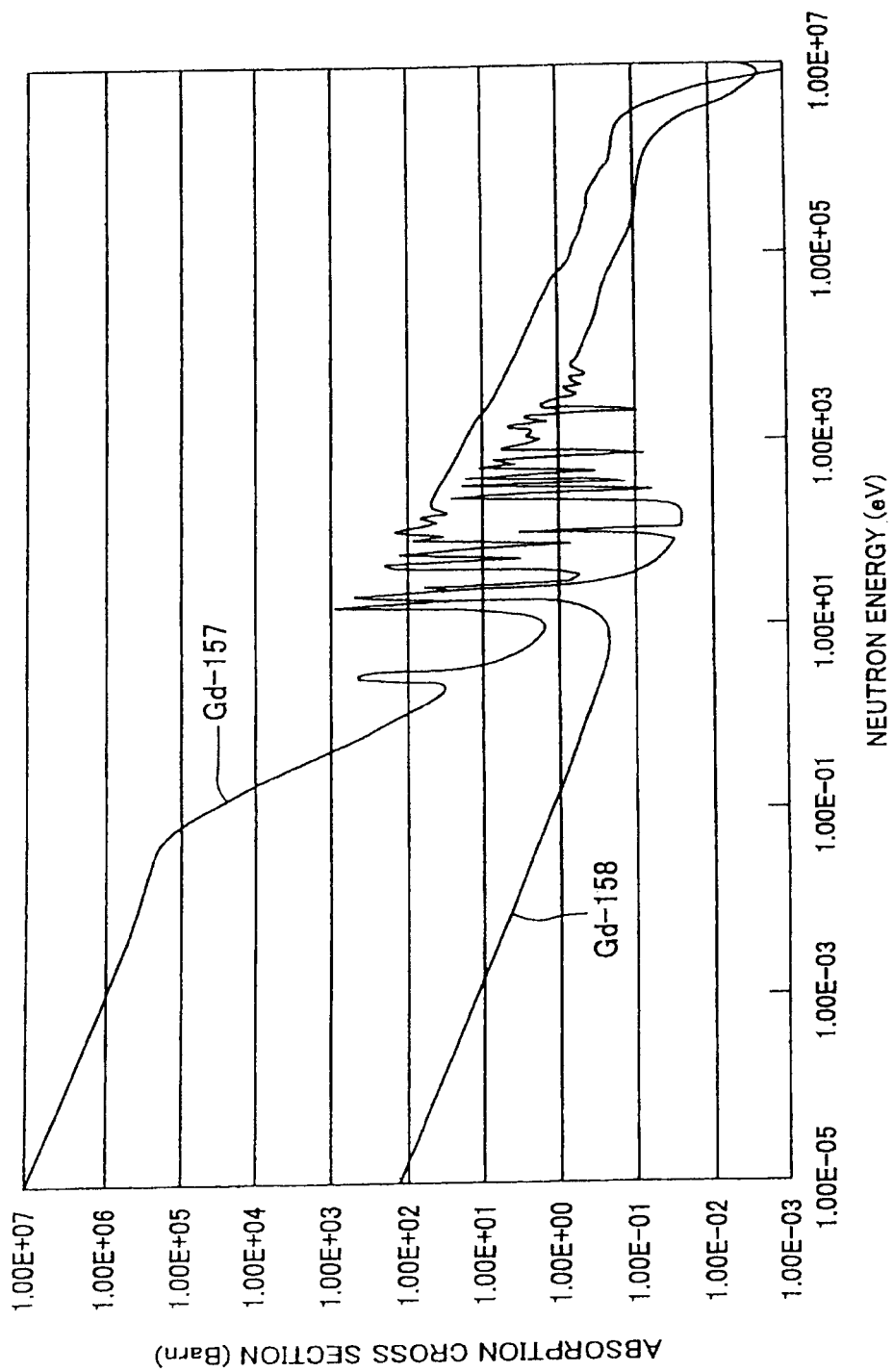
FIG. 22 is a view illustrating a neutron absorption cross section of gadolinium according to the fifth embodiment of the present invention.

That is, FIG. 22 is a view illustrating a neutron absorption cross section of Gd-157, and that of Gd-158.

According to FIG. 22, a light water reactor operates in a thermal region wherein the neutrons in the core are thermal neutrons having the energy of, for example, 1.00 E-02 (eV). Therefore, when the gadolinium of Gd-157 absorbs the neutrons in the core so as to get to be the gadolinium of Gd-158, because the absorption of the Gd-158 is strongly smaller than that of the Gd-157, the Gd-158 is burned so that it is unnecessary to draw the Gd-158.

However, a fast reactor operates wherein the neutrons in the core are high spectrum neutrons having the energy of, for example, 1.00 E+05 (eV). Therefore, in a case of containing the gadolinium of Gd-157 in the core of the fast reactor, when the gadolinium of Gd-157 absorbs the neutrons in the core so as to get to be the gadolinium of Gd-158, because the absorption of the Gd-158 is substantially as well as that of the Gd-157, the Gd-158 is hardly burned so that it must be necessary to draw the Gd-158, whereby, conventionally, it may be hard to use the gadolinium of Gd-157 to the fast reactor.

However, in this fifth embodiment of the present invention, because the core 2A containing the reactivity control assembly 119 including, in addition to the gadolinium, the neutron moderator, it is able to moderate the neutrons in the core 2A so as to correspond to those in a water reactor, making it possible to use the reactivity control assembly 119 to the fast reactor 1F.

Figure 23:
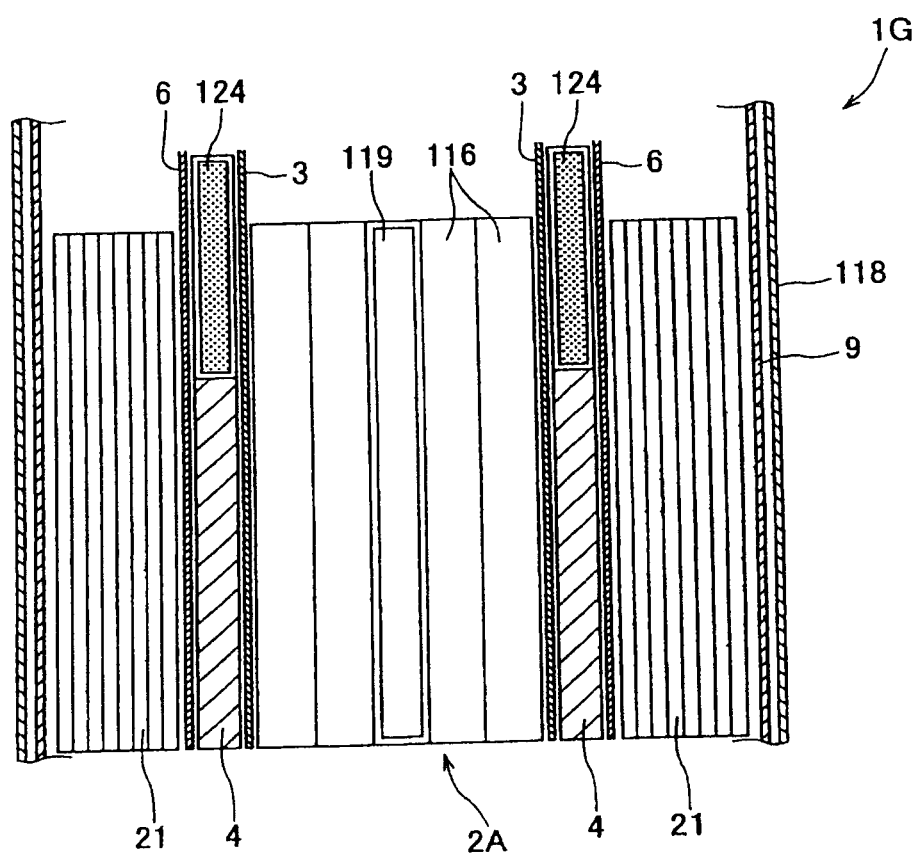
FIG. 23 is a longitudinal sectional view illustrating a fast reactor according to a sixth embodiment of the present invention.

Sixth Embodiment (FIG. 23)

Next, with reference to FIG. 23, a fast reactor 1G according to a sixth embodiment of the present invention will be described below.

FIG. 23 shows principal parts of the fast reactor 1G in this sixth embodiment, and corresponds to FIG. 19A. In FIG. 23, for simplification of explanation, like reference numerals are used to designate the same parts as FIG. 19A. The fast reactor 1G of the sixth embodiment is different from the fast reactor 1F of the above fifth embodiment in that a neutron absorber 124 with a neutron moderator is provided above the neutron reflector 4. The neutron absorber 124 with the neutron moderator includes a material produced by mixing a neutron moderator and a neutron absorber.

Conventionally, the upper portion of the neutron reflector 4 is formed into a cavity in order to improve its value. In this sixth embodiment, the neutron absorber 124 with the neutron moderator is mounted into the cavity.

According to the structure, in addition to the effect of the fifth embodiment, because the neutrons irradiated from the core 2A is moderated to be absorbed in the neutron absorber 124, it is possible to give a neutron shielding function to the reactor 1G, and to simplify the upper structure of the reactor 1G.

Seventh Embodiment

Next, a fast reactor according to a seventh embodiment of the present invention will be described below.

According to this seventh embodiment, the reactivity control assembly has the structure in that the distribution of the neutron moderator in the diametrical direction of the cladding tube 121 is gradually dense toward an inside of the cladding tube 121.

The fast reactor of the seventh embodiment has almost the same effects as the fifth embodiment. Besides, according to the fast reactor of this seventh embodiment, it is possible to prevent a reduction of the initial neutron absorption effect, and to provide a linear reduction of the reactivity. Therefore, according to this seventh embodiment, the reactivity is linear, and the excess reactivity change by the burn-up is linear in appearance. Therefore, it is possible to linearly carry out the burn-up control by the operation of the neutron reflector 4, and thus, to carry out the operation of the neutron reflector 4 at an approximately constant speed, thereby readily performing the burn-up control.

Eighth Embodiment

Next, a fast reactor according to an eighth embodiment of the present invention will be described below.

According to this eighth embodiment, the mixture 122 in the cladding tube 121 of the reactivity control assembly 119 is formed so that the neutron moderator and the neutron absorber are mixed to be filed in the cladding tube 121, and, in this embodiment, as the neutron moderator, graphite is used. The eighth embodiment has almost the same effects as the fifth embodiment. Besides, because of using the graphite as the neutron moderator, it is possible to improve the safety of the fast reactor under the condition of high temperature, to increase the flexibility of designing the fast reactor and to correspond to the fast reactor wherein a coolant outlet temperature thereof is made high.

Ninth Embodiment

Next, a fast reactor according to a ninth embodiment of the present invention will be described below.

In this ninth embodiment, as shown in FIG. 20 in the fifth embodiment, the neutron absorber rod 123 is produced by mounting, as the mixture 122, the neutron moderator and the neutron absorber into the cladding tube 121 by a vibration compaction process.

More specifically, in the case of mixing zirconium hydride and gadolinium as the mixture 122 of the neutron moderator and the neutron absorber, both zirconium hydride and gadolinium are weighted by a predetermined amount, and thereafter, are molded like granules. These granules are gradually put from a top opening portion of the cladding tube 121 whose bottom end is sealed, to be filled therein, while vibration is applied to the cladding tube 121 by a vibrator. After vibration filling, an upper plug is attached onto the top opening portion of the cladding tube 121 to be sealed thereto, and thus, the neutron absorber rod 123 is completed. In this case, the cladding tube 121 is attached on a vibration base of the vibrator, and then, a predetermined vibration is applied the cladding tube 121 thereby.

According to this eighth embodiment, it is possible to simplify a process for forming the neutron absorber rod 123 containing the neutron moderator, and to carry out a remote control in forming of the neutron absorber rod 123. Furthermore, even in the case where the neutron moderator or the neutron absorber is a dangerous material such as a radioactive material, the neutron absorber rod 123 can be readily formed.

Tenth Embodiment

Next, a fast reactor according to a tenth embodiment of the present invention will be described below.

In this tenth embodiment, the cladding tube 121 or the wrapper tube 120 shown in FIG. 20 in the fifth embodiment is provided at its inner surface with an inside coat for preventing hydrogen from being transmitted, for example, a chromium coating layer. The chromium coating layer contacts with the mixture 122 of the neutron moderator and the neutron absorber, for example, the mixture of zirconium hydride and gadolinium.

According to this tenth embodiment, the reactivity control assembly 119 is provided at its inner surface with the inside coat for preventing hydrogen from being transmitted, and then, the reactivity control assembly 119 is mounted into the center portion of the core 2A as shown in FIG. 19A and FIG. 19B. According to the structure, it is possible to prevent hydrogen generated by the burn-up in the core 2A from leaking outside the reactivity control assembly 119. Other effects are the same as the above fifth embodiment.

Eleventh Embodiment

Next, a fast reactor according to an eleventh embodiment of the present invention will be described below.

In this eleventh embodiment, in order to improve a neutron absorptive power of the reactivity control assembly 119, the neutron absorber rod 123 is formed with the mixture 122 made by mixing a fission product (FP) as a neutron absorber and a zirconium hydride as a neutron moderator, and the neutron absorber rod 123 is mounted in the core 2A.

According to this eleventh embodiment, the fission product (FP) is used as the neutron absorber, and thereby, it is possible to effectively use a radioactive material generated by another reactor, and thus, to contribute for a reduction of fission products. Other effects are the same as the fifth embodiment.

Twelfth Embodiment

Next, a fast reactor according to a twelfth embodiment of the present invention will be described below.

In this twelfth embodiment, a mixture 122 of the neutron moderator and a thermal neutron absorber, for example, zirconium hydride and gadolinium in the fifth embodiment, is filled in the fuel assembly 116 at the vicinity of the central portion of the core, and thereby improving a neutron absorptive power.

According to this twelfth embodiment, the fuel assembly 116 is provided with the mixture of the neutron moderator and a thermal neutron absorber, and thereby, there is no need of mounting the reactivity control assembly 119 in the central portion of the core. Further, this serves to readily make a design of the neutron absorber rod mounted in the center of the core or a neutron absorptive channel.

Incidentally, in this embodiment, the mixture 122 is filled in the fuel assembly 116 in the vicinity of the central portion of the core. However, the present invention is not limited to the structure. That is, the neutron absorber may be filled in one of the fuel assemblies 116 in the vicinity of the central portion of the core, and the neutron moderator may be filled in another one of the fuel assembles 116 which is also in the vicinity of the central portion thereof.

Thirteenth Embodiment

Next, a fast reactor according to a thirteenth embodiment of the present invention will be described below.

In this thirteenth embodiment, in each of the aforesaid fast reactors, a mixture of a neutron moderator and a neutron absorber, for example, zirconium hydride and gadolinium, is provided in a burnable poison assembly at the central portion of the core, and thereby, a void reactivity of the final burn-up is transferred to a positive side. The reflector control type of fast reactor of this embodiment has the same function as the fifth embodiment.

In general, in the fast reactor, with the burn-up of the core, a void reactivity rises to a positive side. This means that in the final burn-up, the positive reactivity is increased by spectral hardening in the case where void is generated.

However, as this embodiment, in the case of the fast reactor, which is provided with the neutron absorber rod with the neutron moderator, in the final burn-up, an absorptive effect is reduced in a small neutron energy range. For this reason, in the final burn-up, the burn-up to fission is great in a low neutron energy range as compared with a general fast reactor.

As a result, in the final burn-up, no transfer to a positive reactivity is made with respect to spectral hardening by coolant void generation. Therefore, in the final burn-up, the void reactivity is hard to be transferred to the positive side, and therefore, it is possible to improve safety of the fast reactor.

Fourteenth Embodiment

Next, a fast reactor according to a fourteenth embodiment of the present invention will be described below.

In this fourteenth embodiment, lead or lead-bismuth alloy is used in place of sodium used as the liquid metal coolant in the fifth embodiment. Other construction is the same as the fifth embodiment.

According to this fifteenth embodiment, a fast neutron is moderated so as to be absorbed in the neutron absorber, and thereby, it is possible to improve a neutron absorptive power, and to provide a fast reactor which has a high neutron breeding ratio, thereby elongating a lifetime of the core.

Fifteenth Embodiment

In this embodiment, the volume percent ratios of the neutron moderator and the neutron absorber in the neutron absorber rod 123 in the reactivity control assembly 119 mounted in the core 2A are not uniformed but different according to different positions in the axial direction of the core 2A.

That is, the volume percent ratio of a predetermined portion of the mixture 122 in the neutron absorber rod 123 of the reactivity control assembly 119, which has a height in the axial direction thereof corresponding to the height H1 of the core 2A, is X1 to Y1, wherein the X1 percent is bigger than the Y1 percent, and the volume percent ratio of another predetermined portion of the mixture 122 in the neutron absorber rod 123 of the reactivity control assembly 119, which has a height in the axial direction thereof corresponding to the height H2 of the plenum is X2 to Y2, wherein the X2 percent is bigger than the Y2 percent, and the X1 percent and the Y1 percent are bigger than the X2 percent and the Y2 percent, respectively.

Incidentally, in the above embodiments, the primary coolant, such as the liquid metal is circulated by means of the electromagnetic pump, but the present invention is not limited to the structure.

That is, the electromagnetic pump is omitted in each reactor in each embodiment of the present invention, and the primary coolant is circulated by a natural circulating force generated by, for example, the heating of the core, the radiation from the reactor vessel and the like.

In this modification, it is further possible to reduce the cost of manufacturing the reactor, and because of no use of the electromagnetic pump, it is possible to improve the safety of each reactor in the present invention.

Furthermore, in the fifth embodiment to the fifteenth embodiment of the present invention, as a nuclear reactor, the liquid metal cooled type of fast reactor is applied, but the present invention is not limited to the structure.

That is, in the fifth embodiment to the fifteenth embodiment, as a nuclear reactor, a light water reactor is able to be applied to the present invention, which has the described system for cooling the core, and furthermore, other nuclear reactors can be applied to the present invention.

While there has been described what is at present considered to be the preferred embodiments and modifications of the present invention, it will be understood that various modifications which are not described yet may be made therein, and it is intended to cover in the appended claims all such modifications as fall within the true spirit and scope of the invention.

The invention claimed is:

1. A reactor core immersed in a liquid metal coolant in a core barrel of a liquid metal cooled reactor, the reactor core comprising:
    a plurality of fuel assemblies contained in the core barrel;
    a neutron absorber that absorbs a neutron in the reactor core; and
    a neutron moderator that moderates a neutron therein so as to control a reactivity of the reactor core,
    the neutron absorber and the neutron moderator constituting a mixture contained in reactivity control assemblies of the reactor core in the liquid metal coolant prior to immersion of the reactor core, and the neutron moderator being composed of zirconium hydride.

2. The reactor core according to claim 1, further comprising:
    a reactivity control assembly arranged at a predetermined portion in the fuel assemblies, said reactivity control assembly having a tube portion; and
    a neutron absorber rod assembly contained in the tube portion and having the mixture made of the neutron absorber and the neutron moderator,
    wherein said neutron absorber rod assembly has a plurality of neutron absorber rods each having a cladding tube and the mixture filled therein,
    said mixture is made of the neutron absorber and the neutron moderator,
    said absorber rod assembly is arranged at a center portion of the fuel assemblies,
    said neutron absorber and the neutron moderator is mixed according to a volume percent ratio,
    said volume percent ratio of the neutron moderator and the neutron absorber is X to Y, said X percent being bigger than the Y percent, and
    said volume percent ratios of the neutron moderator and the neutron absorber in the neutron absorber rod in the axial direction are different according to different positions in the axial direction of the core.

* * * * *